United States Patent
Lucas et al.

(10) Patent No.: US 6,725,453 B1
(45) Date of Patent: Apr. 20, 2004

(54) REMOTE SOFTWARE INSTALLATION AND MAINTENANCE

(75) Inventors: Paul J. Lucas, Mountain View, CA (US); Chris J. Hillery, Vacaville, CA (US); Wesley N. T. Pope, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 09/645,013

(22) Filed: Aug. 23, 2000

(51) Int. Cl.[7] .............................................. G06F 9/45
(52) U.S. Cl. ......................................... 717/178; 717/173
(58) Field of Search ............................ 717/178, 173; 703/22

(56) References Cited

U.S. PATENT DOCUMENTS

| | | | | |
|---|---|---|---|---|
| 5,418,713 A | | 5/1995 | Allen ........................... 705/32 |
| 5,418,964 A | * | 5/1995 | Conner et al. .............. 709/316 |
| 5,442,782 A | * | 8/1995 | Malatesta et al. ............. 707/4 |
| 5,636,276 A | | 6/1997 | Brugger ........................ 705/54 |
| 5,734,823 A | | 3/1998 | Saigh et al. ................ 709/229 |
| 5,734,891 A | | 3/1998 | Saigh ........................... 707/10 |
| 5,740,405 A | * | 4/1998 | DeGraaf ....................... 703/22 |
| 5,742,829 A | * | 4/1998 | Davis et al. ................ 717/178 |
| 5,794,052 A | * | 8/1998 | Harding ...................... 717/178 |
| 5,794,217 A | | 8/1998 | Allen ........................... 705/27 |
| 6,167,567 A | * | 12/2000 | Chiles et al. ............... 717/173 |
| 6,430,738 B1 | * | 8/2002 | Gross et al. ................ 717/176 |

OTHER PUBLICATIONS

Assorted PACK documents from http://sunsite.dk/pack/ et seq. (21 pages).

* cited by examiner

*Primary Examiner*—John Chavis
(74) *Attorney, Agent, or Firm*—Woodcock Washburn LLP

(57) ABSTRACT

A human engineer using a computer system can maintain numerous software services and packages installed on a number of servers through a single master server and a computer network. Each software service and package is represented in a package and service template datastore in a templatized form in which server-specific information is represented by placeholder data. To install a service or package on a destination server computer, data specific to the destination server is substituted for the corresponding placeholder data in program modules, configuration data files, and installation scripts and the program modules, configuration data files, and installation scripts are transported to the destination server where the installation scripts are executed. To support simultaneous installations of multiple versions of a software package, a given software package includes a first directory which is version-independent and additional, separate directories for each version of the software package installed on the destination server computer.

42 Claims, 21 Drawing Sheets

| Services | Packages | IPs | Machines | (Actions) |

Edit Existing Service Version

Name & Version: lmn 2.5    Copy to Version: [ I ]

Comment: [ na ]    Comment: [ I ]

[Return to Service Version list]    [Copy Version] [Clear]

Package(s) for Service    IP(s) & Machine(s) for Service

```
lms 5.0a8.1
lms 5.0a9
lms 5.0a9-1
logrotate 3.3
mysql 8.22.27
oracle 8.0.5-client
perl 5.004_04
riffsd 1.0
rms 6.0
rms 7.0
```

```
208.48.112.59 redshirt
208.48.88.58 ronjeremy
209.19.117.87 rosemary
206.132.160.74 saffron
208.48.112.49 saffron
208.48.112.54 saffron
208.48.88.13 sage
208.48.88.14 sage
208.48.88.25 salt
208.48.88.26 salt
```

[Update Packages] [Reset]    [Update IP's] [Reset]

[Edit IP Types]

Fig. 13

| Services | Packages | IPs | Machines | (Actions) |

Review Actions

Select the radio button for the latest action to be committed.

| | (commit none) | | |
|---|---|---|---|
| | Action Description | User | Timestamp |
| ◇ | add package: zip | pjl | 13-APR-2000 11:34 |
| ◇ | add package version: zip-1.0 | pjl | 13-APR-2000 11:34 |

Software will be deployed only for actions where ANY ONE of the following is true:

1. An IP address with a service assigned to it is assigned to a machine.
2. A service assigned to an IP address (that is assigned to a machine).
3. A package is added to a service (that is assigned to an IP address that is assigned to a machine).
4. A package has been added as a dependency to a package that is used by a service (that is assigned to an IP address that is assigned to a machine).

Non-committed actions WILL BE ROLLED BACK.

[ Commit & Deploy ]

Fig. 21

REMOTE SOFTWARE INSTALLATION AND MAINTENANCE

FIELD OF THE INVENTION

The present invention relates to remote installation of computer software and, in particular, to a mechanism for automatically, accurately, and remotely installing and updating computer software distributed over a computer network.

BACKGROUND OF THE INVENTION

The Internet is just the latest of a growing number of large computer networks in which a number of server computer systems provide services to countless client computer systems. Each of the server computer systems require maintenance as new software is made available or existing software is upgraded.

Such maintenance typically involves a human computer engineer accessing each server individually and customizing software for each server. Requiring human access to each individual server effectively limits the number of servers that can be maintained and represents a relatively high cost for such maintenance.

What is needed is a mechanism by which software installation and maintenance to various servers of a computer network can be more automated and, as a result, more error-free. Such a system would significantly reduce the cost in providing large numbers of such servers.

SUMMARY OF THE INVENTION

In accordance with the present invention, a human engineer using a computer system can maintain numerous software services and packages installed on a number of servers through a single master server and a computer network. Each software service and package is represented in a package and service template datastore in a templatized form in which server-specific information is represented by placeholder data. To install a service or package on a destination server computer, data specific to the destination server is substituted for the corresponding placeholder data in program modules, configuration data files, and installation scripts and the program modules, configuration data files, and installation scripts are transported to the destination server where the installation scripts are executed.

Execution of the installation scripts copies program modules and configuration data files to locations specified in the installation scripts and can also create symbolic links which make the program modules available and accessible to clients of the service represented by the program modules, configuration data files, and installation scripts. Within the destination server, such program files and configuration data files are stored in such a manner that multiple versions of the same software package can simultaneously execute within the destination server.

In particular, version-independent data is separated from version-dependent data. A given software package includes a first directory which is version-independent and additional, separate directories for each version of the software package installed on the destination server computer. Data which is version-independent, i.e., which is applicable to more than one version of the package, is stored in the version-independent directory. Data which is version-dependent, i.e., which is specific to a particular version of the package, is stored in the version-dependent directory for the particular version of the package to which the data pertains.

All versions of a particular package retrieve version-independent data from the version-independent directory. Accordingly, aspects of the package which are to remain constant across various versions are specified in a single location and therefore do remain constant. Each version of a particular package retrieves version-dependent data from the version-dependent directory for that version. As a result, multiple versions of the package execute properly and simultaneously.

Multiple, simultaneous versions of a software package provide a significant benefit. The following example is illustrative. Consider that a collection of software providing a first service to client computers has been present on a server computer for some time and relies on a particular version of a software package to faithfully and reliably provide the first service. Consider further that a new collection of software which provides a new, second service to client computers and requires a newer version of the same software package is to be installed on the server computer system. Installation of the newer version of the package may cause the first service to no longer function properly, requiring modification of the first collection of software and adaptation to the newer version of the package. Such represents a significant amount of effort and expense.

However, in accordance with the present invention, both versions of the package can be available on the server computer simultaneously such that the first service continues to be provided reliably and without change while the new, second service can be added to thereby more fully utilize the computing resources of the server computer. The present invention therefore represents a significant improvement over prior art systems.

BRIEF DESCRIPTION OF THE DRAWINGS

FIG. 13 is a screen view of the user interface by which a network manager edits an existing service version record in the package/service interdependence database of FIG. 2.

FIG. 21 is a screen view of the user interface by which a network manager commits or rolls back actions in the package/service interdependence database of FIG. 2.

DETAILED DESCRIPTION

Figure 1:
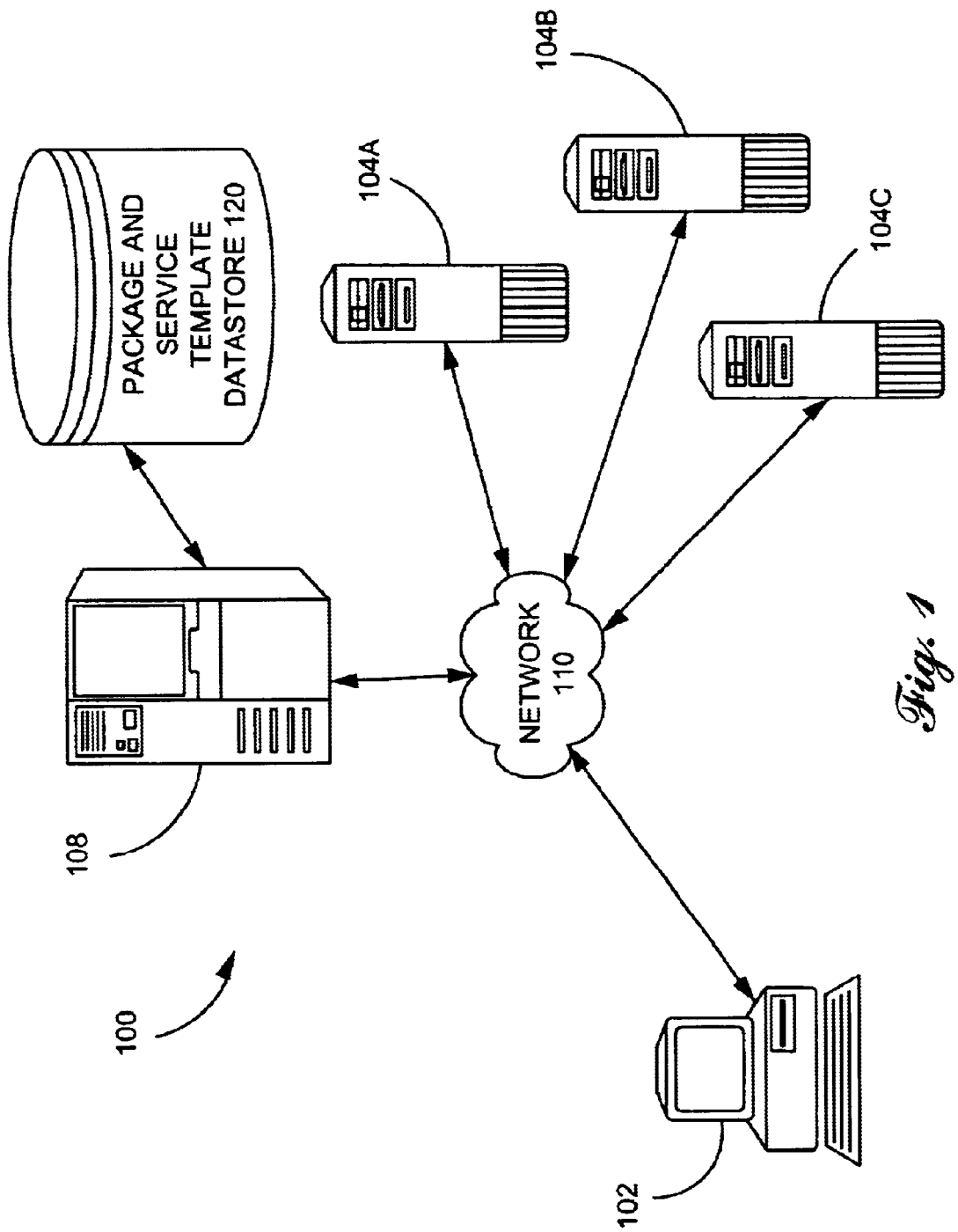
FIG. 1 is a block diagram of a software distribution and installation system in accordance with the present invention.

In accordance with the present invention, a human engineer using a computer system 102 can maintain numerous software services and packages installed on a number of servers 104A–C (FIG. 1) through a single master server 108 and a computer network 110. As described more completely below, each software service and package is represented in a package and service template datastore 120 in templatized form.

As used herein, services and packages are types of computer software, i.e., computer instructions and data which collectively define one or more tasks to be carried out by one or more computers. A service is generally a collection of computer software which, when executed, serves requests for data and/or processing through a computer network such as computer network 110—i.e., remote requests. A package is generally a collection of computer software which, when executed, serves local requests for data and/or processing—i.e., requests from other computer processes executing in the same computer. Within any of servers 104A–C, a service can depend upon, i.e., submit requests to, one or more packages within the same server. Similarly, a package within any of servers 104A–C can submit requests to, and therefore depend upon, one or more other packages within the same server. The distinction herein between services and packages is primarily conceptual and somewhat arbitrary and, in other embodiments, services and packages can be treated identically. In this illustrative embodiment, services and packages also differ in that multiple versions of a package can be installed in a single one of servers 104A–C while only a single version of any service is permitted to be installed in any server.

Within package and service template datastore 120, each service and package is represented in a templatized form. Specifically, a template 202 (FIG. 2) represents a complete installation of a service or a package with any and all server-specific information represented by placeholder data. In this illustrative embodiment, servers 104A–C are Internet servers running a Unix-type operating system and the server-specific information includes an Internet protocol (IP) address and a machine host name of the server. Such information is represented in template 202 by "%%WEB_IP%%" or "%%MUSIC_IP%%" for IP addresses and "%%MACHINE_NAME%%" for machine host names. Other placeholder data can be used for other installation-specific data within template 202. The following table identifies placeholder data and the information represented thereby.

TABLE A

| Placeholder Data | Information Represented |
| --- | --- |
| %%SERVICE_DOMAIN_NAME%% | A fully qualified domain name of a service (e.g., www.liquidmusic-network.com). |
| %%MACHINE_DOMAIN_NAME%% | A domain name of a specific server computer (e.g., liquidaudio.com). |
| %%MACHINE_NAME%% | A machine name of a server without a domain (e.g., saffron). |
| %%MUSIC_IP%% | An IP address used for a particular type of service (e.g., to stream and/or download music - both HTTP and non-HTTP). |
| %%package-name_ROOT%% | An absolute path to a version-independent directory for the package identified by package-name. |
| %%package-name_VERSION%% | A version number for the package identified by package-name. |
| %%package-name_VROOT%% | An absolute path to a version-dependent directory for the package identified by package-name. |
| %%SERVICE_NAME%% | A name of a service. |
| %%SERVICE_ROOT%% | An absolute path to a version-independent directory for the service. |
| %%SERVICE_VERSION%% | A version number of the service. |
| %%SERVICE_VROOT%% | An absolute path to a version-dependent directory for the service. |
| %%WEB_IP%% | An IP address used for connections through the World Wide Web. |

Template 202 includes one or more configuration data files 204, one or more installation scripts 206, and one or more program modules 208. Configuration data files 204 include configuration data which influences the behavior of program modules 208 during execution and can include server-specific information represented by placeholder data as described above. Installation scripts 206 include commands to be executed by a server to effect installation of the service or package represented by template 202. Installation scripts 206 can similarly include server-specific information represented by placeholder data as described above. Program modules 208 contain computer instructions and data which specify actions to be taken by a computer to thereby provide the service or package represented by template 202. Installation of a service or package from template 202 is described more completely below.

Figure 3:
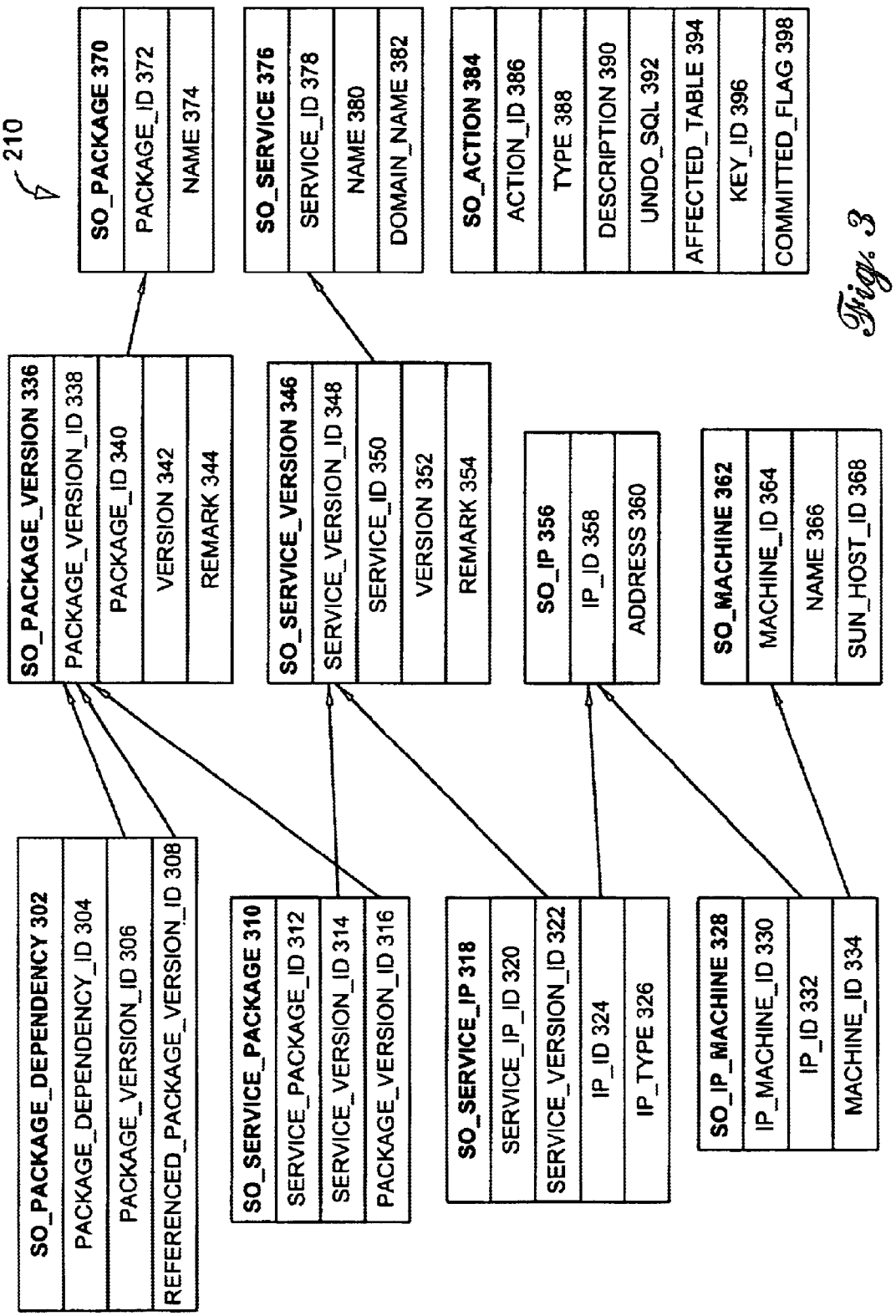
FIG. 3 is a block diagram of the package/service interdependence database of FIG. 2 in accordance with the present invention.

Package and service template datastore 120 also includes a package/service interdependency database 210 which is shown in greater detail in FIG. 3. A service is represented in package/service interdependency database 210 by a service record within service table 376, and a package is represented by a package record within package table 370. Service records of service table 376 include a service identifier 378 which uniquely identifies the service represented by the service record, a name 380 of the service, and a domain name 382 by which the service can be requested through computer network 110 (FIG. 1), which is the Internet in this illustrative example. Package records of package table 370 (FIG. 3) include a package identifier 372, which uniquely identifies the package represented by the package record, and a name 374 of the package.

Figure 11:
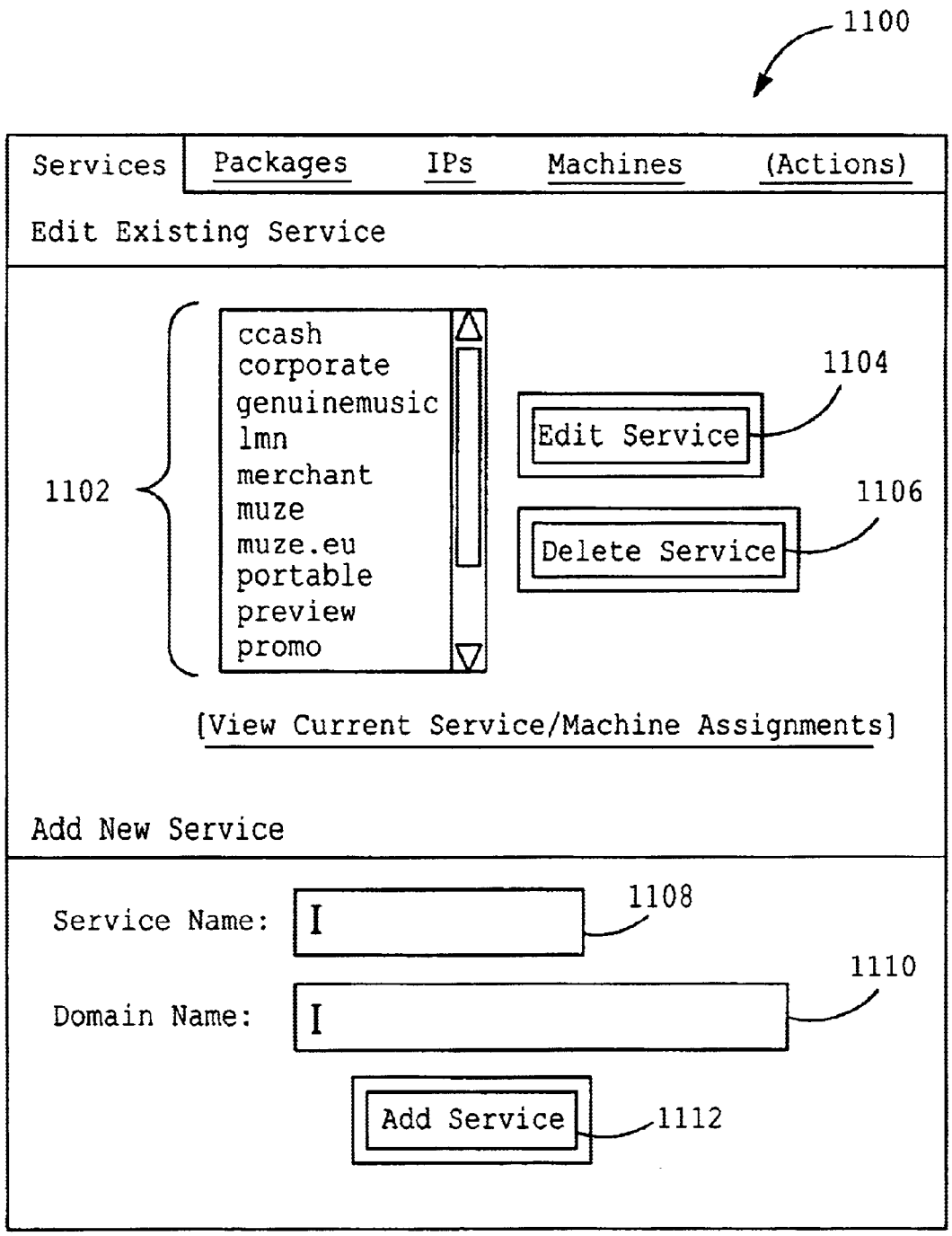
FIG. 11 is a screen view of the user interface by which a network manager can add, delete, or edit a service record in the package/service interdependence database of FIG. 2.
Figure 12:
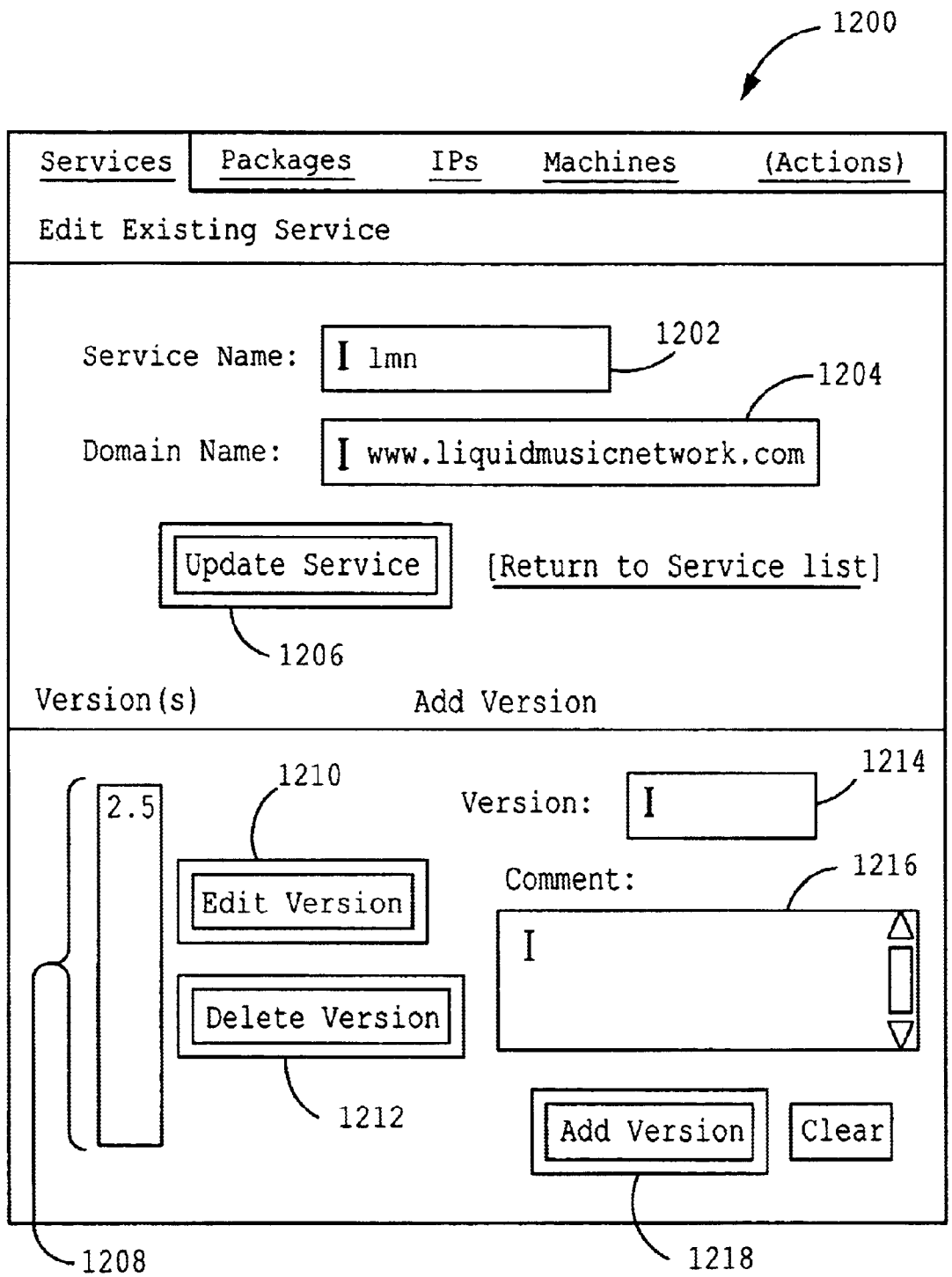
FIG. 12 is a screen view of the user interface by which a network manager edits an existing service record in the package/service interdependence database of FIG. 2.

FIG. 11 shows a display 1100 of a web browser, executing in computer 102 for example, which provides a user interface by which a network manager modifies contents of service table 376 (FIG. 3). Display 1100 shows an HTML (hypertext markup language) form by which the network manager can specify desired changes to service table 376. Web browsers and HTML forms are known and are not described herein.

Display 1100 (FIG. 11) includes a list 1102 of services currently represented in service table 376 (FIG. 3). The items listed in list 1102 are the service names represented by name 380 of individual records in service table 376. The network manager can add a new service to service table 376 by entering the name (for storage as name 380) of the service in text box 1108, entering the corresponding domain name (for storage as domain name 382) in text box 1110, and pressing button 1112 using conventional user interface techniques including physical manipulation of user input devices. As described more completely below, actions which effect addition of the new service are stored in an action list and can be rolled back. The rolling back of actions on the tables of package/service interdependency database 210 is described below in conjunction with FIG. 21. Similarly, all modifications to package/service interdependency database 210 described below in conjunction with FIGS. 11–20 are represented by actions stored in action list 384 (FIG. 3) such that all modifications to package/service interdependency database 210 can be rolled back prior to commitment by the network manager.

The network manager removes an existing service from service table 376 by selecting the name of the service from list 1102 and pushing button 1106 using conventional user interface techniques. Similarly, the network manager edits an existing service within service table 376 by selecting the name of the service from list 1102 and pushing button 1104.

In response to selecting a service and pushing button 1104, master server 108 sends an HTML form through computer network 110 to computer 102 such that display 1200 (FIG. 12) is presented to the network manager. Though the form of display 1200, the network manager can modify the name of the service in text box 1202 and the domain name of the service in text box 1204. Upon pushing button 1206, the form data of display 1200 is sent to master server 108 (FIG. 1) and, in response thereto, master server 108 adds to the list of pending actions, an action in which the selected service record is modified such that name 380 (FIG. 3) stores the name as modified in text box 1202 (FIG. 12) and domain name 382 stores the domain name as modified in text box 1204.

Figure 14:
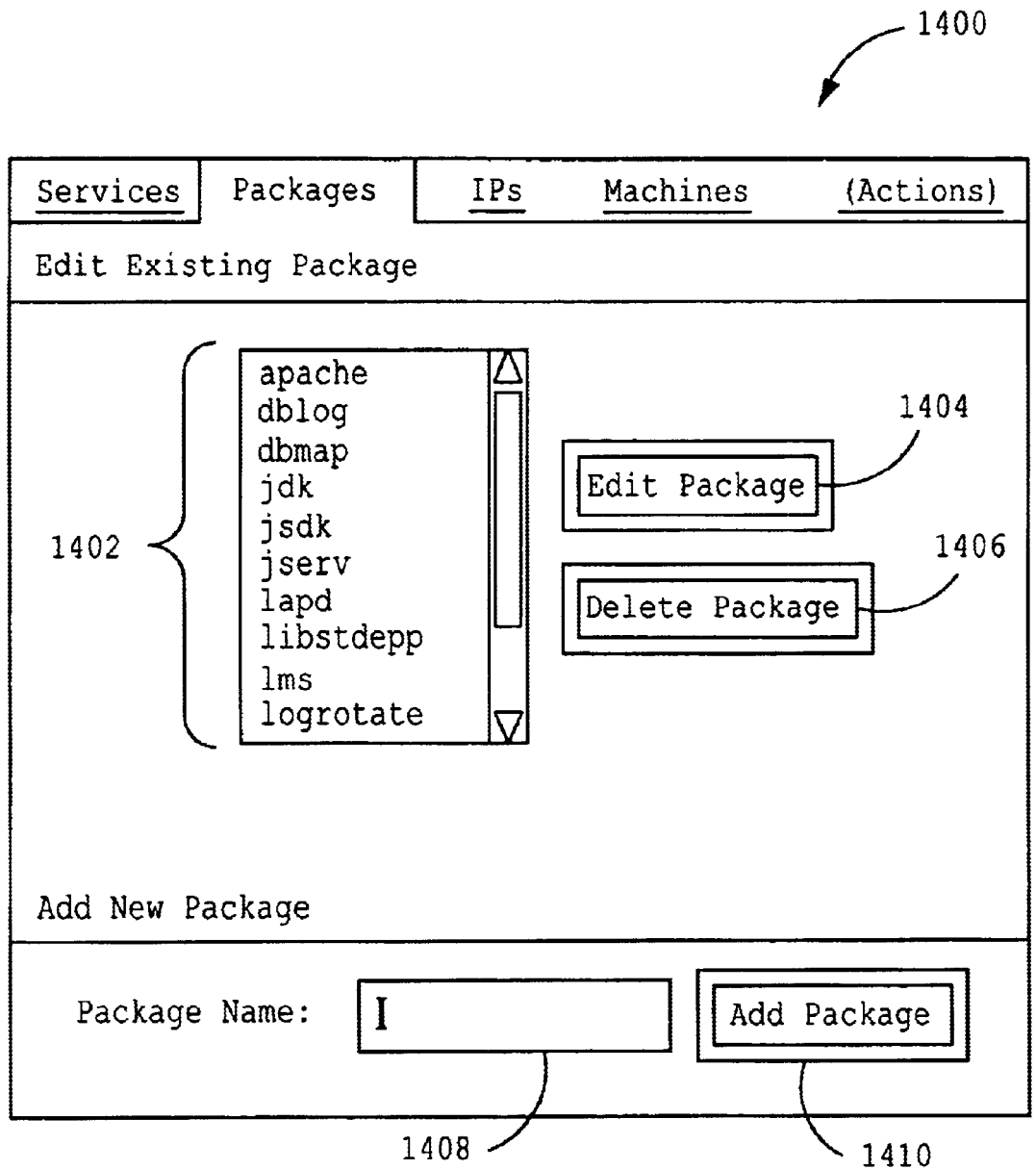
FIG. 14 is a screen view of the user interface by which a network manager edits an existing package record in the package/service interdependence database of FIG. 2.

Display 1400 (FIG. 14) includes a list 1402 of names of packages (from name 370) currently represented in package table 370 (FIG. 3). The network manager can add a new package to package table 370 by entering the name of the package in text box 1408 (FIG. 14) and pressing button 1410. As a result, the form data of display 1400 is sent through computer network 110 (FIG. 1) to master server 108 and master server 108 adds to the list of pending actions an action to add a package record to package table 370 (FIG. 3) whose name 374 is the name specified in text box 1408 (FIG. 14).

The network manager removes an existing package from package table 370 (FIG. 3) by selecting the name of the package from list 1402 (FIG. 14) and pushing button 1406. The result is an action to delete the specified package record appended to the list of pending actions. Similarly, the network manager edits an existing package within package table 370 (FIG. 3) by selecting the name of the package from list 1402 (FIG. 14) and pushing button 1404. In editing a package, the network manager can modify the name of the package, and the name as modified is represented in name 374 (FIG. 3) by an action appended to the list of pending actions.

Multiple versions of services and packages are supported in the system described herein, and multiple versions of packages can coexist in the system described herein. Accordingly, service version records of a service version table 346 (FIG. 3) represent specific versions of a service, e.g., the service represented within service table 376 as shown in FIG. 3. A service version record includes a service version identifier 348 which uniquely identifies the service version represented by the service version record, a service identifier 350 which identifies the service to which the service version record corresponds, a version 352, and a remark 354. Since multiple versions of a service can exist within package/service interdependency database 210, other service version records can also identify the same service record, through service identifier 378, as the service to which the other service version records correspond.

Display 1200 (FIG. 12) includes form components to allow addition, deletion, and modification of service versions of service version table 346. In particular, the network manager removes a service version by selecting the version from a list 1208 (FIG. 12) and pushing button 1212. The items of list 1208 are values stored in version 352 (FIG. 3) of service version table 346. The network manager adds a new version to service version table 346 by entering the version (version 352) in text box 1214 (FIG. 12), entering a comment (remark 354) in text box 1216, and pushing button 1218. The associated service (service identifier 350) is the service represented in text boxes 1202–1204. The network manager edits a service version of service version table 346 by selecting the version from list 1208 and pushing button 1210. In response to pushing button 1210, master server 108 (FIG. 1) presents the HTML form of display 1300 (FIG. 13) to the network manager. The form of display 1300 is described below.

Package version records of a package version table 336 (FIG. 3) represent specific versions of a package. A package version record includes a package version identifier 338 which uniquely identifies the package version represented by the package version record, a package identifier 340 which identifies the package to which the package version record corresponds, a version 342, and a remark 344. Since multiple versions of a package can exist simultaneously, other package version records can also identify the same package record, through package identifier 372, as the package to which the other package version records correspond.

Display 1500 (FIG. 15) represents a form by which the network manager can edit an existing package and add, delete, and/or modify versions of a package. The network manager can add to the list of pending actions an action changing the name of the package as represented by name 374 (FIG. 3) by modifying the name represented in text box 1502 (FIG. 15) and pushing button 1504.

Figure 15:
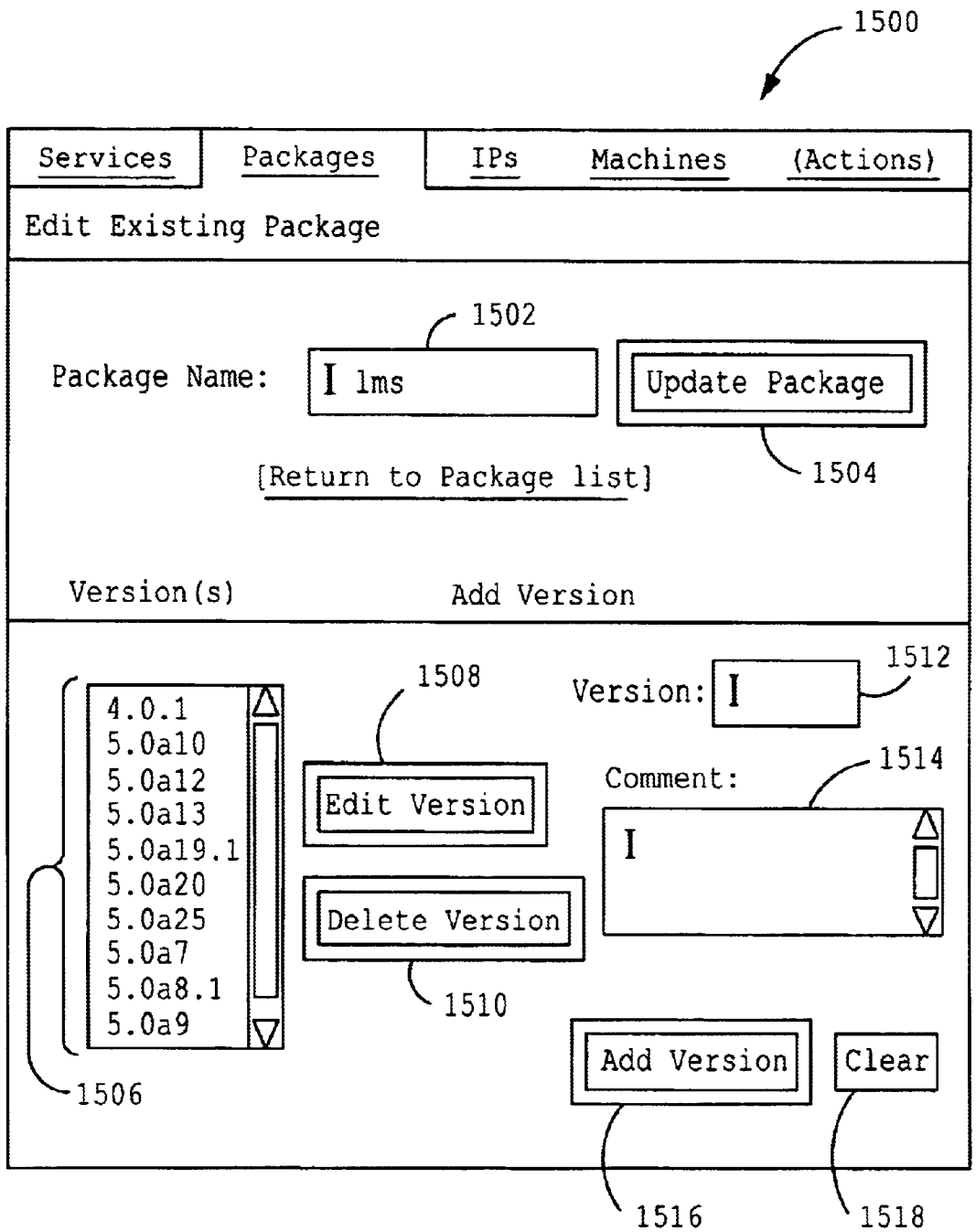
FIG. 15 is a screen view of the user interface by which a network manager a network manager can add, delete, or edit a package record in the package/service interdependence database of FIG. 2.

Versions of the package whose name appears in text box 1502, i.e., the subject package in the context of FIG. 15, are listed in list 1506. The items of list 1506 are version names as represented by version 352 (FIG. 3) for each version of the subject package stored in package/service interdependency database 210. To add a new version of the subject package, the network manager enters the name of the new version in text box 1512 (FIG. 15) and can enter any associated comments (to be stored as remark 344) in text box 1514 and pushes button 1516. To delete a version of the subject package, the network manager selects a version name from list 1506 (FIG. 15) and pushes button 1510. To edit a version of the subject package, the network manager selects a version name from list 1506 (FIG. 15) and pushes button 1508.

In response to pushing of button 1508, master server 108 (FIG. 1) sends data representing the form of display 1600 (FIG. 16) through computer network 110 to computer 102 for display to the network manager. The package name and version are represented in combination in text box 1602 and the network manager can modify the name and version of the package in text box 1602 using conventional user interface techniques. Remark 344 (FIG. 3) is represented in text box 1604 and can be modified there by the network manager using conventional user interface techniques.

As described above, a service can depend upon one or more packages. Such dependency is represented in respective service-package records of service-package table 310. A service-package record includes a service-package identifier 312 which uniquely identifies the service-package dependency represented by the service-package record. The service-package record also includes a service version identifier 314 and a package version identifier 316. Service version identifier 314 identifies the service—and version of the service—which is dependent upon a package, and package version identifier 316 identifies the package—and version of the package—upon which the service is dependent.

Figure 16:
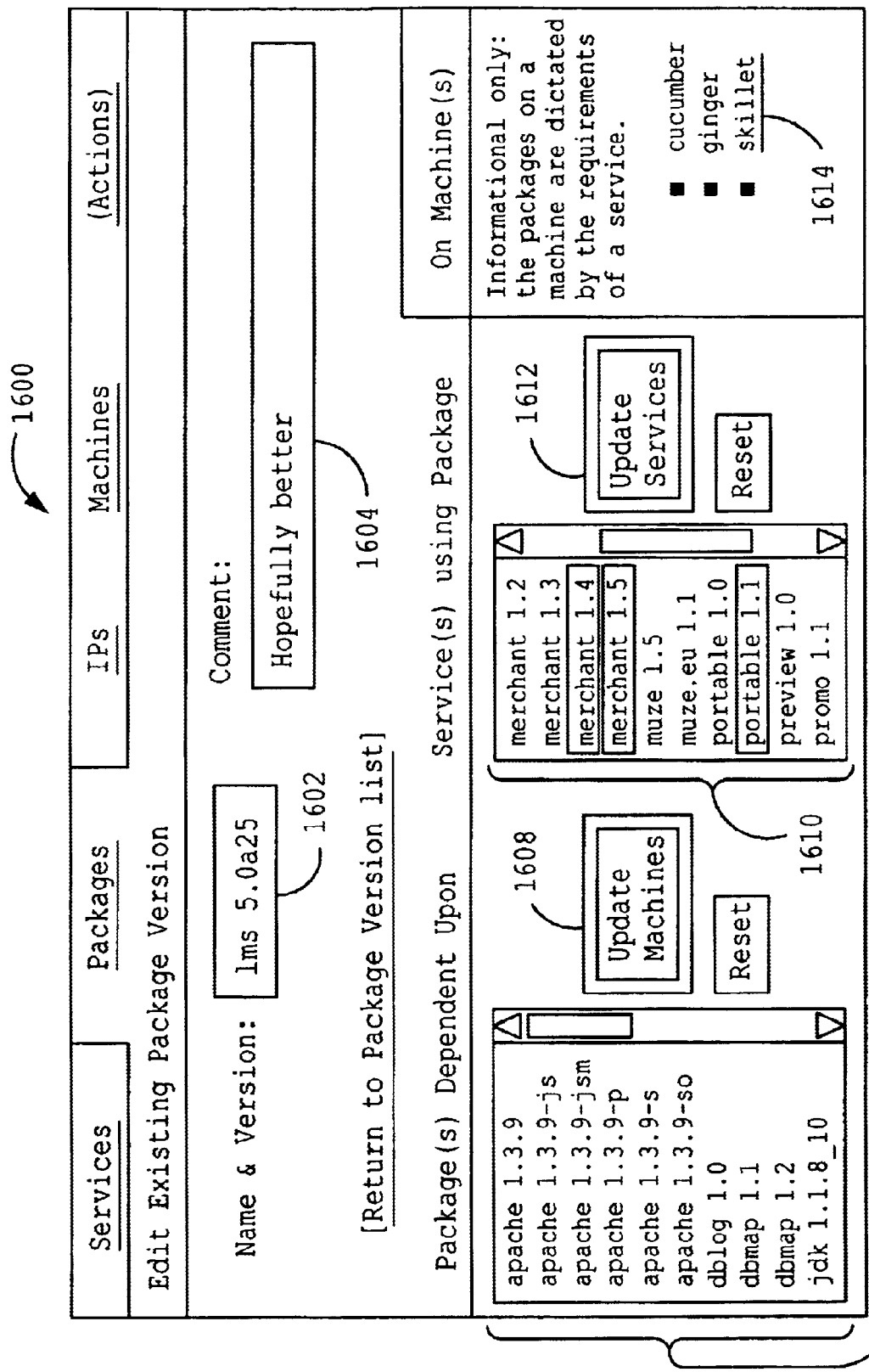
FIG. 16 is a screen view of the user interface by which a network manager edits an existing package version record in the package/service interdependence database of FIG. 2.

Dependency of a service upon a package, e.g., version 5.0a25 of the "lms" package, is reflected in display 1600 (FIG. 16). List 1610 includes names and versions of various services represented in package/service interdependency database 210 (FIG. 3). Those services which depend upon the subject package version, i.e., the package version represented in text box 1602 (FIG. 16), are shown in a highlighted state. For example, version 1.4 of the merchant service is shown to depend upon version 5.0a25 of the lms package. Accordingly, package/service interdependency database 210 (FIG. 3) includes, in service-package table 310, a record identifying both version 1.4 of the merchant service in service version table 346 and version 5.0a25 of the lms package in package version table 336. The network manager can delete such a dependency by clicking on "merchant 1.4" in list 1610 (FIG. 16) and pushing button 1612. Similarly, the network manager can create a similar dependency between version 1.5 of the muze service and version 5.0a25 of the lms package by clicking on "muze 1.5" in list 1610 and pushing button 1612.

Similarly, a package can depend upon one or more other packages. Such dependency is represented in respective package dependency records of package dependency table 302 (FIG. 3). A package dependency record includes a package dependency identifier 304 which uniquely identifies the inter-package dependency represented by the package dependency record. A package dependency record also includes package version identifiers 306 and 308. Package version identifier 306 identifies the package—and version of the package—which is dependent upon a package, i.e., the referenced package, and package version identifier 308 identifies the referenced package—and version of the referenced package—upon which the former package is dependent.

Packages on which version 5.0a25 of the lms package can depend are listed by package name and version in list 1606 (FIG. 16). Packages on which version 5.0a25 of the lms package does depend are shown in a highlighted state— display 1600 shows no such dependencies. The network manager can add and delete such dependencies using list 1606 and button 1608 in the manner described above with respect to list 1610 and button 1612.

As described above, server-specific information includes an IP address for the server and a host name or similar machine identifier of the server. Such information is represented by IP records of IP table 356 (FIG. 3) and machine records of machine table 362, respectively. In particular, an IP record includes an IP identifier 358 which uniquely identifies the IP record and an IP address 360. A machine record includes a machine identifier 364 which uniquely identifies the machine record, a name 366 and a host identifier 368. Host identifier 368 stores a hardware identifier associated with a particular one of servers 104A–C (FIG. 1) and, in this illustrative embodiment, is a Sun host identifier assigned by the manufacturer of the one of servers 104A–C, namely, Sun Microsystems Inc. of Palo Alto, Calif. Name 366 (FIG. 3) stores data by which a particular one of servers 104A–C (FIG. 1) is identified and is generally selected in a manner to be more memorable to human network managers in determining which of servers 104A–C should provide which services.

Figure 17:
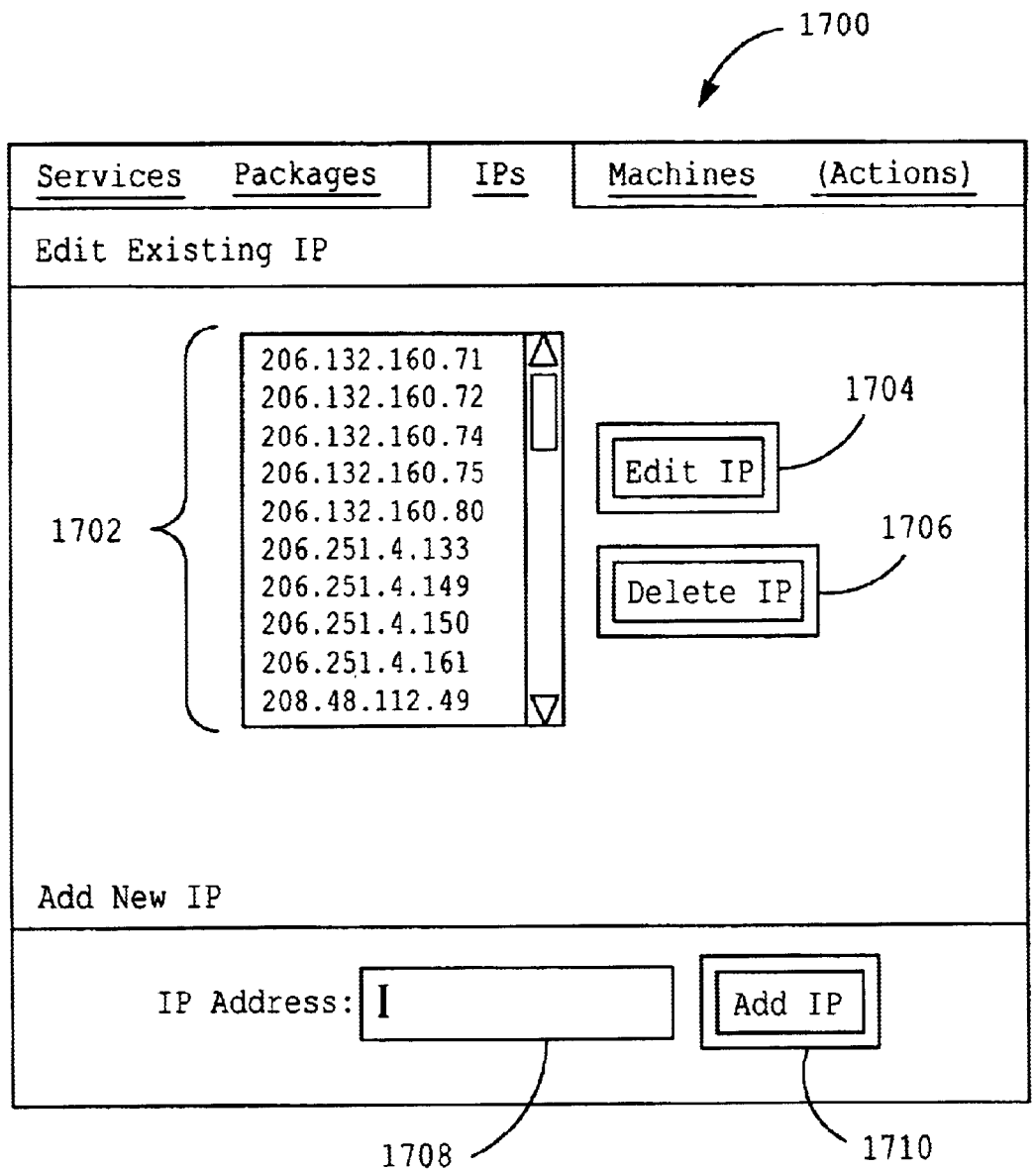
FIG. 17 is a screen view of the user interface by which a network manager can add, delete, or edit an IP address record in the package/service interdependence database of FIG. 2.
Figure 18:
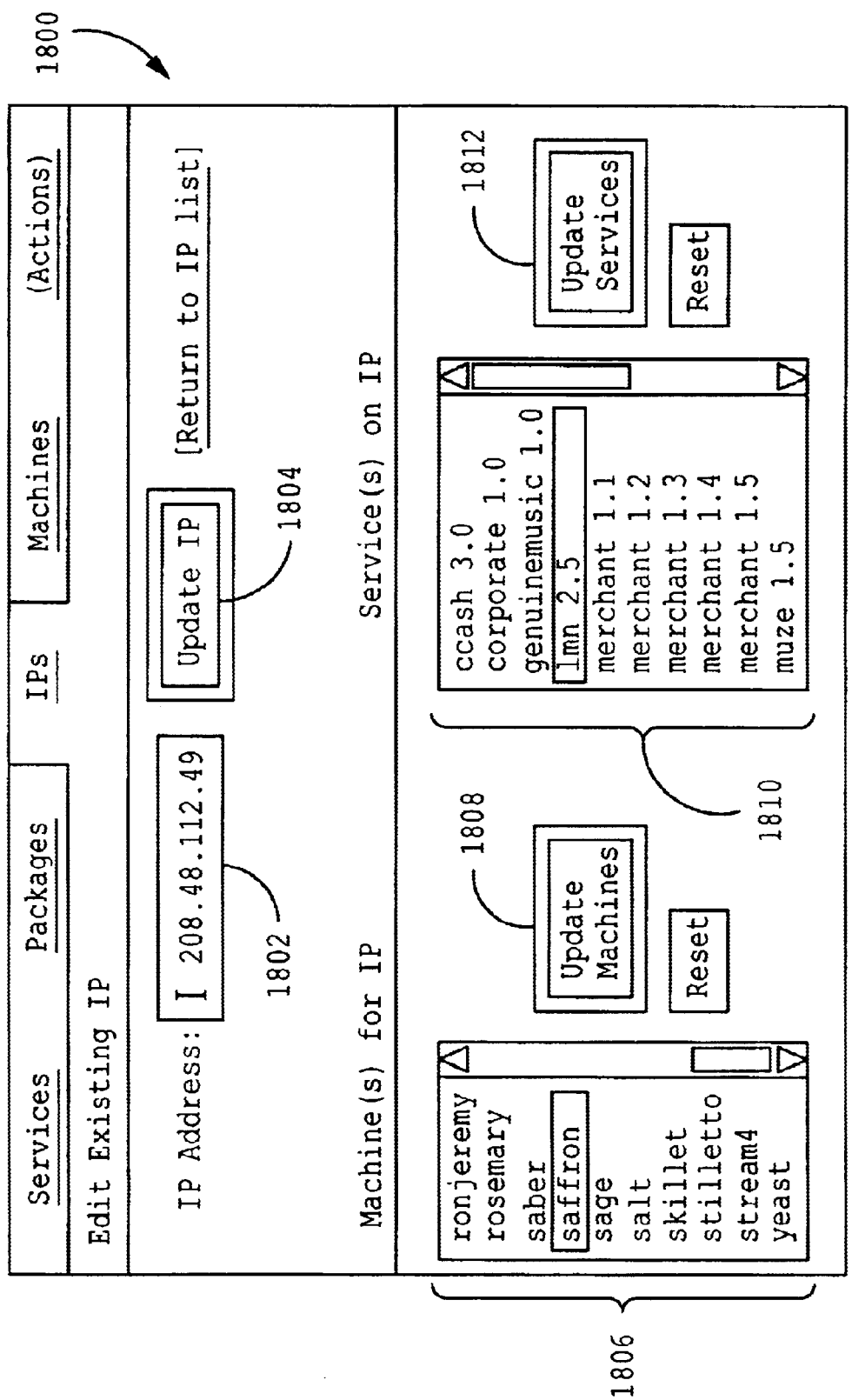
FIG. 18 is a screen view of the user interface by which a network manager edits an existing service in the package/service interdependence database of FIG. 2.

Display 1700 (FIG. 17) shows a from by which the network manager adds, deletes, and modifies IP records of IP table 356 (FIG. 3). IP addresses (e.g., address 360) represented in package/service interdependency database 210 are listed in list 1702 (FIG. 17). To add a new IP address, the network manager enters the new IP address into text box 1708 and pushes button 1710. To delete an IP address, the network manager selects the address from list 1702 and pushes button 1706. To edit an IP address, the network manager selects the address from list 1710 and pushes button 1704.

In response to pushing button 1704, display 1800 (FIG. 18) is presented to the network manager. The selected IP address is represented in text box 1802 and the network manager can modify the IP address there. The network manager presses button 1804 to effect the changes to the selected IP address.

Figure 19:
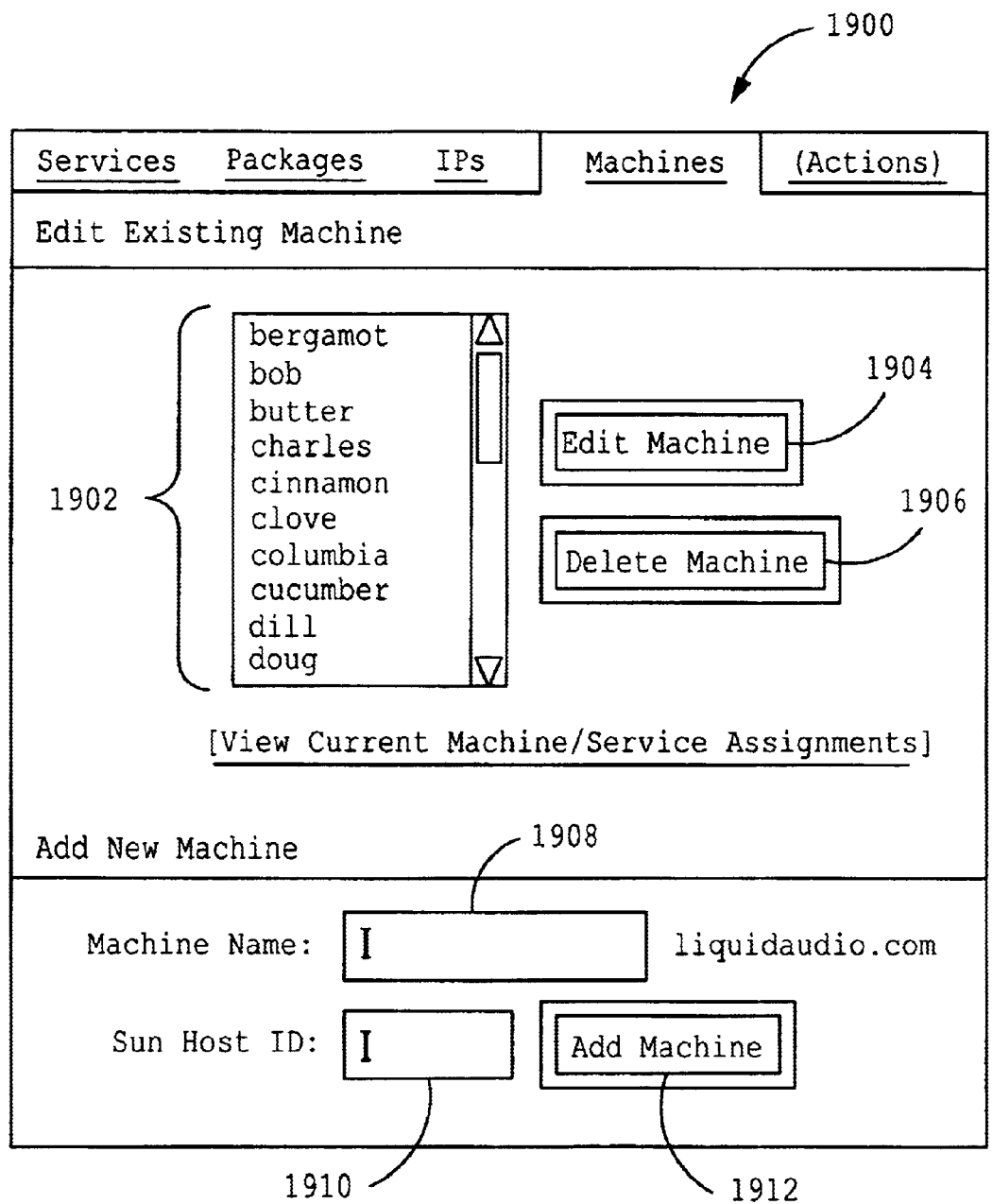
FIG. 19 is a screen view of the user interface by which a network manager can add, delete, or edit a machine record in the package/service interdependence database of FIG. 2.

Display 1900 (FIG. 19) shows a form by which the network manager can add, delete, and modify machine records of machine table 362 (FIG. 3). Machines (e.g., machine name 366) represented in package/service interdependency database 210 are listed in list 1902 (FIG. 19). To add a new machine, the network manager enters the new machine name into text box 1908, enters an associated host identifier (to be stored as host identifier 368) in text box 1910, and pushes button 1912. To delete a machine, the network manager selects the machine from list 1902 and pushes button 1906. To edit a machine, the network manager selects the machine from list 1902 and pushes button 1904.

In response to pushing button 1904, display 2000 (FIG. 20) is presented to the network manager. The selected machine is represented in text box 2002 and the host identifier of the selected machine is represented in text box 2004. The network manager can modify the machine name and host identifier in text boxes 2002 and 2004, respectively. The network manager presses button 2006 to effect the changes to the selected machine.

IP addresses and machine names are associated with one another through IP-machine records of IP-machine table 328 (FIG. 3). An IP-machine record includes an IP-machine identifier 330 which uniquely identifies the IP-machine record, an IP identifier 332, and a machine identifier 334. IP identifier 332 identifies the IP record of IP table 356 as representing the IP address with which the machine is associated, and machine identifier 334 identifies machine record of machine table 362 as representing the machine with which the IP address is associated.

Figure 20:
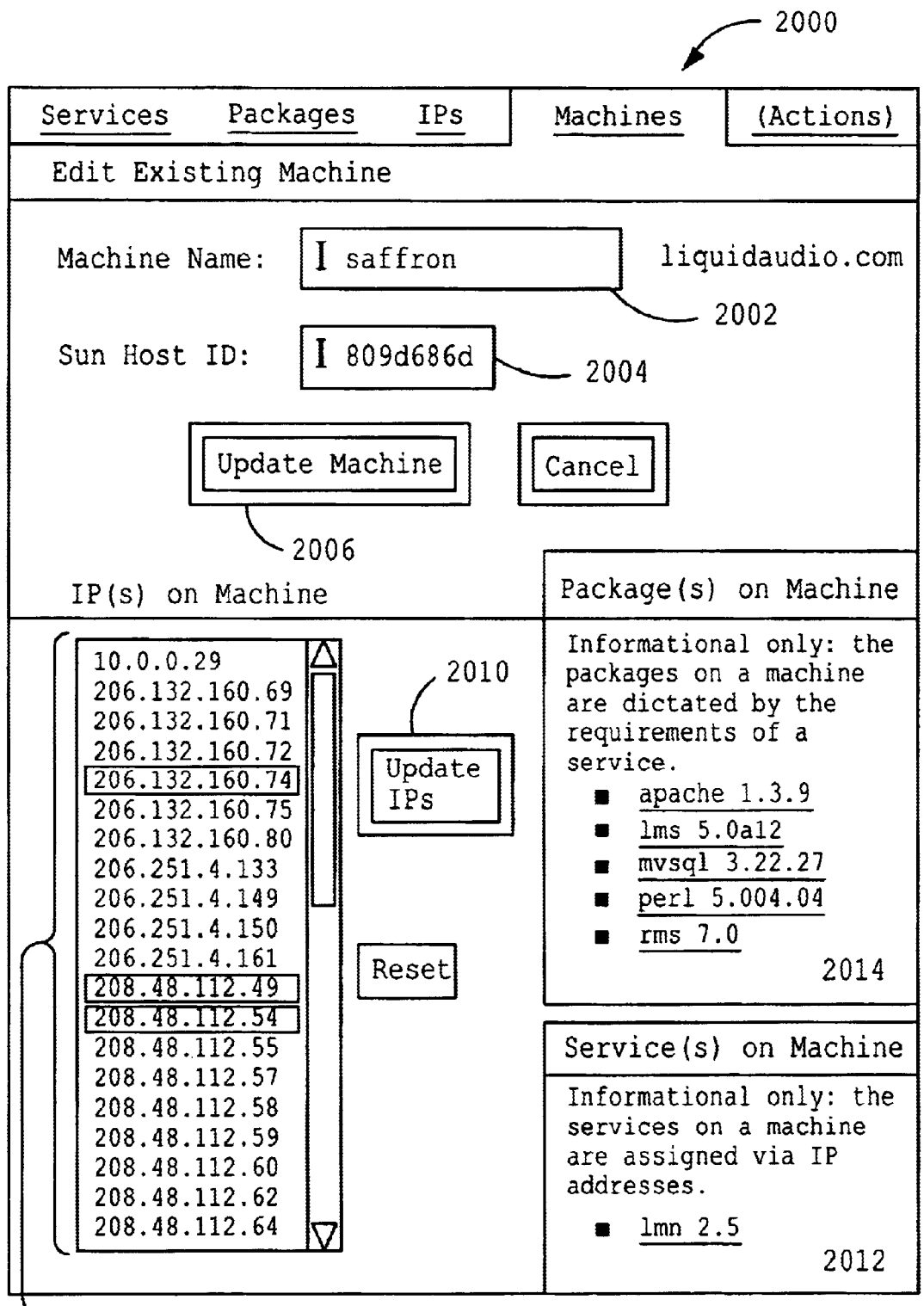
FIG. 20 is a screen view of the user interface by which a network manager edits an existing machine record in the package/service interdependence database of FIG. 2.

Associations between machines and IP addresses can be altered by the network manager in two ways: one through display 1800 (FIG. 18) and another through display 2000 (FIG. 20).

Display 1800 (FIG. 18) includes a list 1806 of names of machines represented in machine table 362 (FIG. 3). Those machines which are associated with the IP address represented in text box 1802 (FIG. 18) are shown in list 1806 in a highlighted state. The network manager toggles a machine's association with the IP address represented in text box 1802 by selecting the machine's name in list 1806 and pressing button 1808.

In display 2000 (FIG. 20), list 2008 represents IP address represented in IP table 356 (FIG. 3). Those IP address which are associated with the machine represented in text box 2002 (FIG. 20) are shown in list 2008 in a highlighted stated. The network manager toggles an IP address's association with the machine represented in text box 2002 by selecting the IP address in list 2008 and pressing button 2010.

As described more completely below, association of a service with all server-specific information necessary for installation, e.g., an IP address and machine name in this illustrative embodiment, causes installation of the service. Such an association is represented by a service-IP record of service-IP table 318 (FIG. 3). A service-IP record includes a service-IP identifier 320 which uniquely identifies the service-IP record, a service version identifier 322, an IP identifier 322, and an IP type 326. Service version identifier 322 identifies a service version record of service version table 346 as representing the associated service version, and IP identifier 322 identifies an IP record of IP table 356 as representing the associated IP address. The requisite server-specific information is only present, in this illustrative embodiment, if the associated IP address is also associated with a machine name as represented within IP-machine table 328. IP type 326 stores data representing a type of IP address. IP type 326 allows multiple IP addresses to be assigned to a single one of servers 104A–C (FIG. 1) for different purposes and to be distinguished from one another according to the purpose identified as a type of IP. In this illustrative embodiment, a single server can have an IP address for World Wide Web services, such as serving HTTP requests, and can have a second IP address for music services, such as delivering data representing sample music or purchased music. Thus, in this illustrative embodiment, there are two types of IP addresses that can be assigned to a single server, namely, web IP addresses and music IP addresses.

The form of display 1800 (FIG. 18) allows the network manager to define associations between IP addresses and versions of services. In particular, display 1800 includes a list 1810 of versions of services represented in service version table 346 (FIG. 3). Those service versions which are associated with the IP address represented in text box 1802 (FIG. 18) are shown in list 1810 in a highlighted state. The network manager toggles a service version's association with the IP address represented in text box 1802 by selecting the service's name and version in list 1810 and pressing button 1812.

Figure 2:
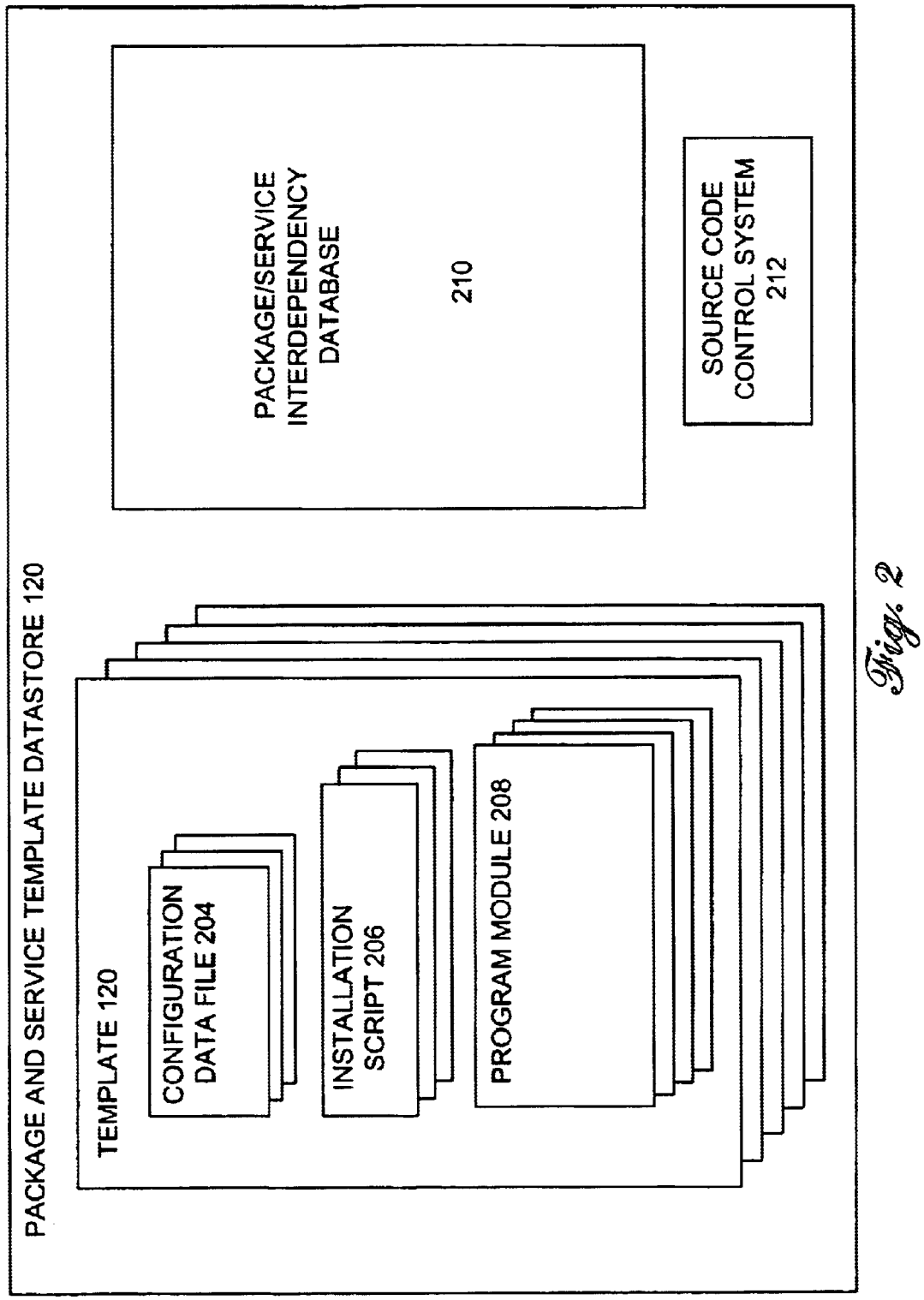
FIG. 2 is a block diagram of a package and service datastore of the system of FIG. 1.

Logic flow diagram 400 (FIG. 4) illustrates the user interface by which a network manager effects changes in package/service interdependency database 210 (FIG. 2). In step 402 (FIG. 4), the network manager is authenticated. Authentication can be accomplished through any currently used authentication mechanisms including, for example, requiring the network manager to supply user identification data and an associated password.

In step 404 (FIG. 4), the network manager specifies changes to service/package interdependency database 210 (FIGS. 2 and 3). In this illustrative embodiment, the network manager, through computer system 102 (FIG. 1) and computer network 110, accesses a user interface implemented by master server 108. The user interface is implemented through the HTML forms which are described above with respect to FIGS. 11–20 and through which the network manager specifies a number of actions.

In database management, transactions involving a database are used to minimize data inconsistencies for others accessing the database during data writing. A transaction is a collection of one or more data access operations which are to be executed as a unit. Such allows the network manager to work over a period of time to configure a group of inter-related data access operations, perform the operations in a relatively short period of time, and roll back the changes if necessary. Implementation of transactions through HTML forms is particularly difficult since the nature of HTML form interaction allows termination of such interaction at any time. In particular, an HTML form is presented as any other web page but allows the user to submit data in response to the form. Once such data is submitted, the user is generally free to terminate interaction and to browser other web pages. Thus, HTML forms generally do not rely upon prolonged interaction with a particular user.

Part of the difficulty in implementing database transactions is that changes to a database are cumulative. For example, a network manager can add a new service and then associate that service with one or more packages. However, to represent such associations in service-package table 310, for example, would require that a service version identifier 348 had already been created. While creation of the service version record within service version table 346 would create such an identifier, such creation should be executed with the action creating the association between the service and the package as parts of a single transaction.

To implement database transactions using HTML forms, service/package interdependency database 210 (FIG. 3) represents uncommitted actions in an action table 384. When the network manager specifies an action to be performed on service/package interdependency database 210, e.g., by pushing any of the buttons of FIGS. 11–20, the action is performed and is represented by an action record stored in action table 384 (FIG. 3). Action records of action table 384 provide a mechanism by which actions can be rolled back and provide an indication whether actions have been committed. As described below, actions are effectively limited to master server 108 (FIG. 1), i.e., have no effect on servers 104A–C, until such actions are committed. However, immediate execution of the action allows a subsequent action to specify data from a previously executed but uncommitted action.

For example, adding a new package as described above with respect to FIG. 14 has an immediate effect such that the new package is listed subsequently in display 1300 (FIG. 13). Accordingly, the network manager is able to specify an association between the newly added package and a service in the manner described above with respect to FIG. 13. In particular, list 1302 is created by reading all version of all packages from package version list 336 which includes the recently added new package.

The newly executed action has no effect outside master server 108 because no package or service is deployed if the package or service relied upon an uncommitted action and uncommitted actions are eventually undone if not committed.

An action record of action table 384 includes an action identifier 386 which uniquely identifies the action represented by the action record. In addition, an action record includes a type 388, a description 390, an undo command 392, an affected table 394, a key identifier 396, and a committed flag 398. Type 388 specifies the type of action and can represent an insertion, a deletion, or a modification of a record of service/package interdependency database 210. Description 390 stores data summarizing the action to a human network manager. Description 390 is intended to provide a meaningful summary of the action such that a human network manager can evaluate whether the action should be performed or rolled back. Undo command 392 is a database access command whose performance effectively reverses the action represented by the action record. Actions are rolled back by execution of the respective undo commands 392 of the rolled-back actions. Affected table 394 specifies the table affected by the action. For example, if the action record represents a modification of an IP address, affected table 394 specifies IP table 356 as the table within which the action is to be performed. Key identifier 396 specifies the specific record within the table to be affected. Continuing in the example of modification of an IP address, key identifier 396 specifies the IP identifier, e.g., IP identifier 358, of the particular IP record to modify. Committed flag 398 indicates whether the action represented by the action record has been committed.

Through interaction between the network manager and master server 108 (FIG. 1) through computer system 102 and computer network 110, actions that are performed at the request of the network manager are added to the current list until the network manager believes that the current list of actions will cumulatively have the desired effect on service/package interdependency database 210. The network manager clicks on tab 2102 to request display 2100 (FIG. 21).

Figure 4:
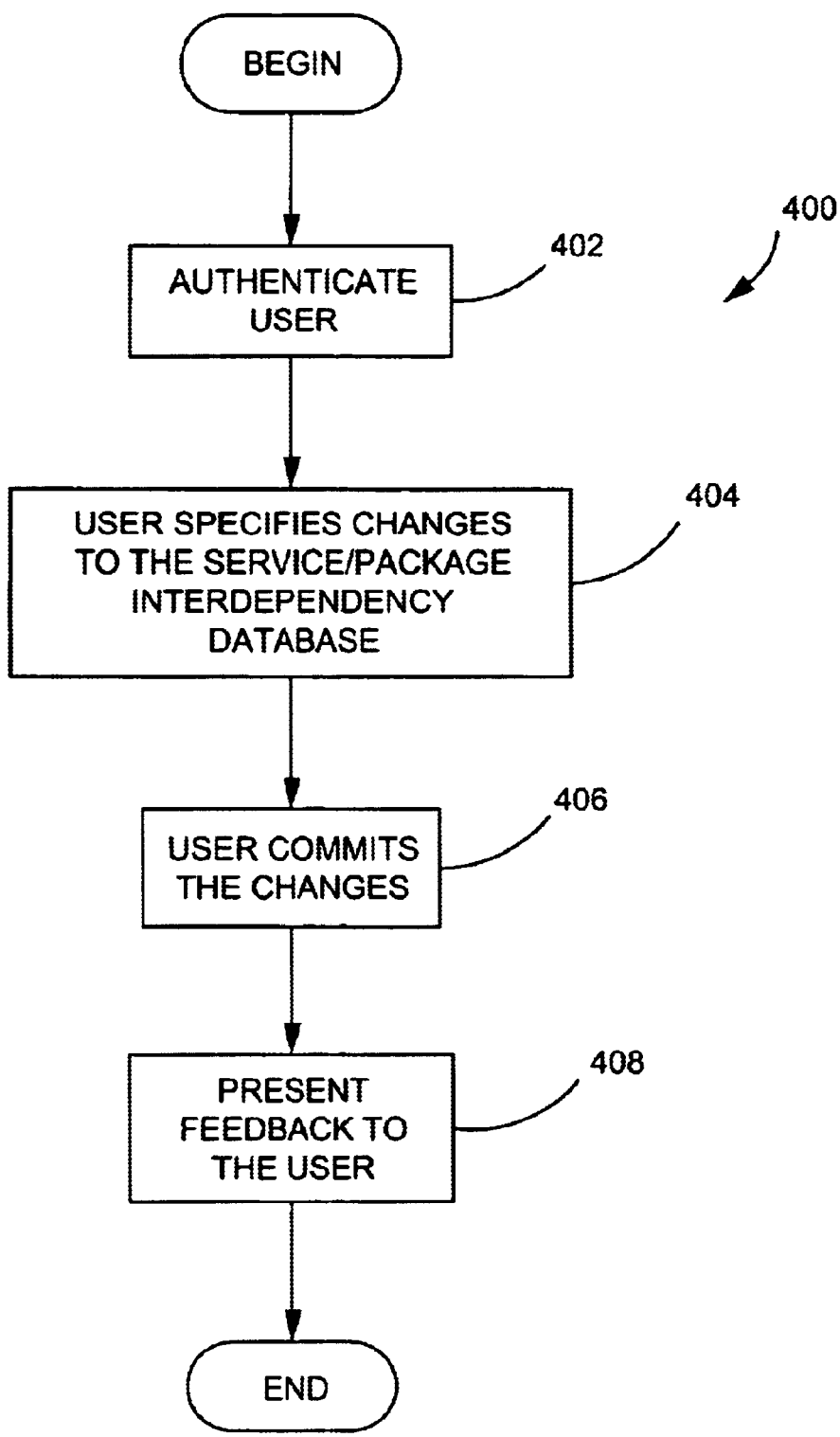
FIG. 4 is a logic flow diagram of the user interface by which the user specifies changes to packages and services are maintained with the servers of FIG. 1.

Display 2100 includes a list of radio buttons 2104–2108. Radio buttons are a known user interface mechanism. Briefly, the network manager can select only one of radio buttons 2104–2108; selection of any of radio buttons 2104–2108 automatically de-selects all others. The network manager selects one of radio buttons 2104–2108 and pushes button 2110. The selected radio button identifies the last pending action of action table 384 to be committed. All pending actions submitted earlier than the selected pending action are also committed. All pending actions subsequent to the selected pending action are rolled back. If the network manager selects radio button 2104, no pending actions are committed and all pending actions are rolled back. Pressing of button 2110 is represented as step 406 (FIG. 4).

In response to pushing of button 2110 (FIG. 21) by the network manager, master server 108 (FIG. 1) sets committed flag 398 (FIG. 3) of all committed action records according to the selected radio button of display 2100 (FIG. 21). Actually performing the actions of the current list can take several minutes, and requiring the network manager to await acknowledgment that the actions were performed would be inconvenient for the network manager. Accordingly, master server 108 sends acknowledgment after merely marking the action records as committed, i.e., after merely setting committed flag 398, thereby providing feedback to the network manager in step 408 (FIG. 4) much more quickly. Typically, the actions of the list will already have been performed within package/service interdependency database 210 and any rolling back of actions can be performed asynchronously with respect to feedback provided to the network manager in response to pushing button 2110 (FIG. 21). In one embodiment, rolling back of actions is performed synchronously with respect to feedback provided to the network manager in response to pushing button 2110.

As described above, the network manager can specify that one or more pending actions are to be rolled back. To roll back those actions, master server 108 performs the undo commands, e.g., undo command 392, of those respective actions of the current list to remove the associated action records from action table 384. After step 408 (FIG. 4), processing according to logic flow diagram 400 completes.

A number of conditions cause master server 108 (FIG. 1) to initiate installation of one or more services and/or packages. A service is ready for installation when the service is associated with all server-specific information necessary for an installation. In this illustrative embodiment, such server-specific information includes an IP address and a machine name. A package is ready for installation if a service or another package which depends upon the package is ready for installation.

Commitment of the following actions can initiate installation of a service or a package:

(a) an action which inserts an IP-machine record into IP-machine table 328 and (i) the inserted IP-machine record associates a machine record of machine table 362 with an IP record of IP table 356 and (ii) the IP record is in turn associated with a service version record of service version table 346 by a service-IP record of service IP table 318;

(b) an action which inserts a service-IP record into service-IP table 318 and (i) the inserted service-IP record associates a service with an IP record and (ii) the IP record is in turn association with a machine record by a machine-IP record in machine-IP table 328;

(c) an action which inserts a service-package record in service-package table 310 and (i) the service is associated with an IP through service-IP table 318 and (ii) the IP is associated with a machine through IP-machine table 328; and (d) an action which inserts a package dependency record into package dependency table 302 and (i) the inserted package dependency record associates, directly or indirectly through other package dependency records, a package with another package and (ii) the other package is associated with a service through service-package table 310 and (iii) the service is associated with an IP through service-IP table 318 and (iv) the IP is associated with a machine through IP-machine table 328.

It should be noted that, in this illustrative embodiment, commitment of actions (a)-(d) is what can cause installation and not performance of actions (a)–(d). As described briefly above, uncommitted actions are limited in their effect to master server 108 and do not effect servers 104A–C.

Figure 5:
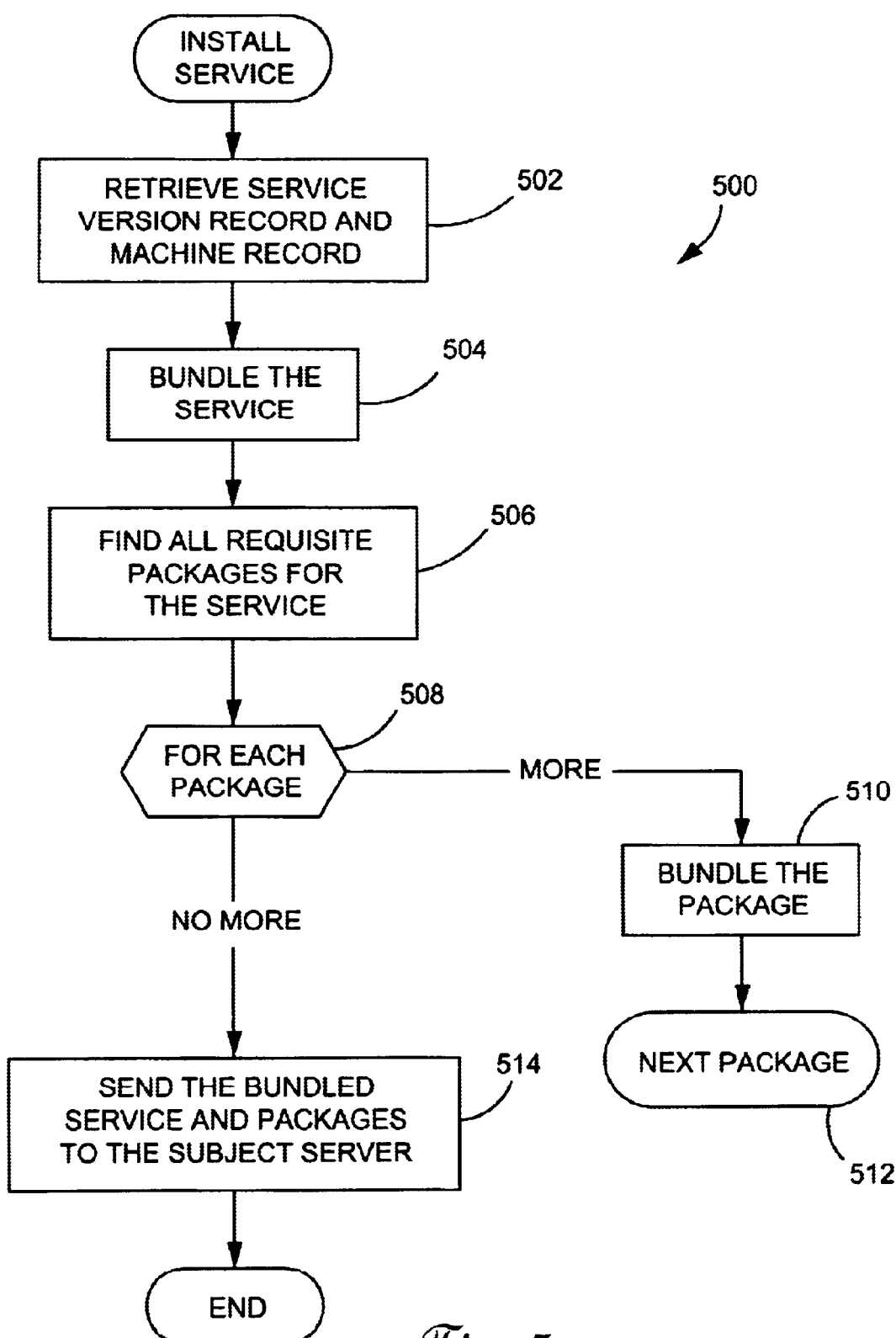
FIG. 5 is a logic flow diagram of the installation of a service and requisite packages in accordance with the present invention.

Commitment of actions (a) and (b) cause installation of the service and all packages on which the service depends, directly or indirectly, as shown by logic flow diagram 500 (FIG. 5). Commitment of actions (c) and (d) cause installation of the requisite package and all packages, on which the requisite package depends, directly or indirectly, as shown by logic flow diagram 510 (FIG. 6) which is described below.

Figure 7:
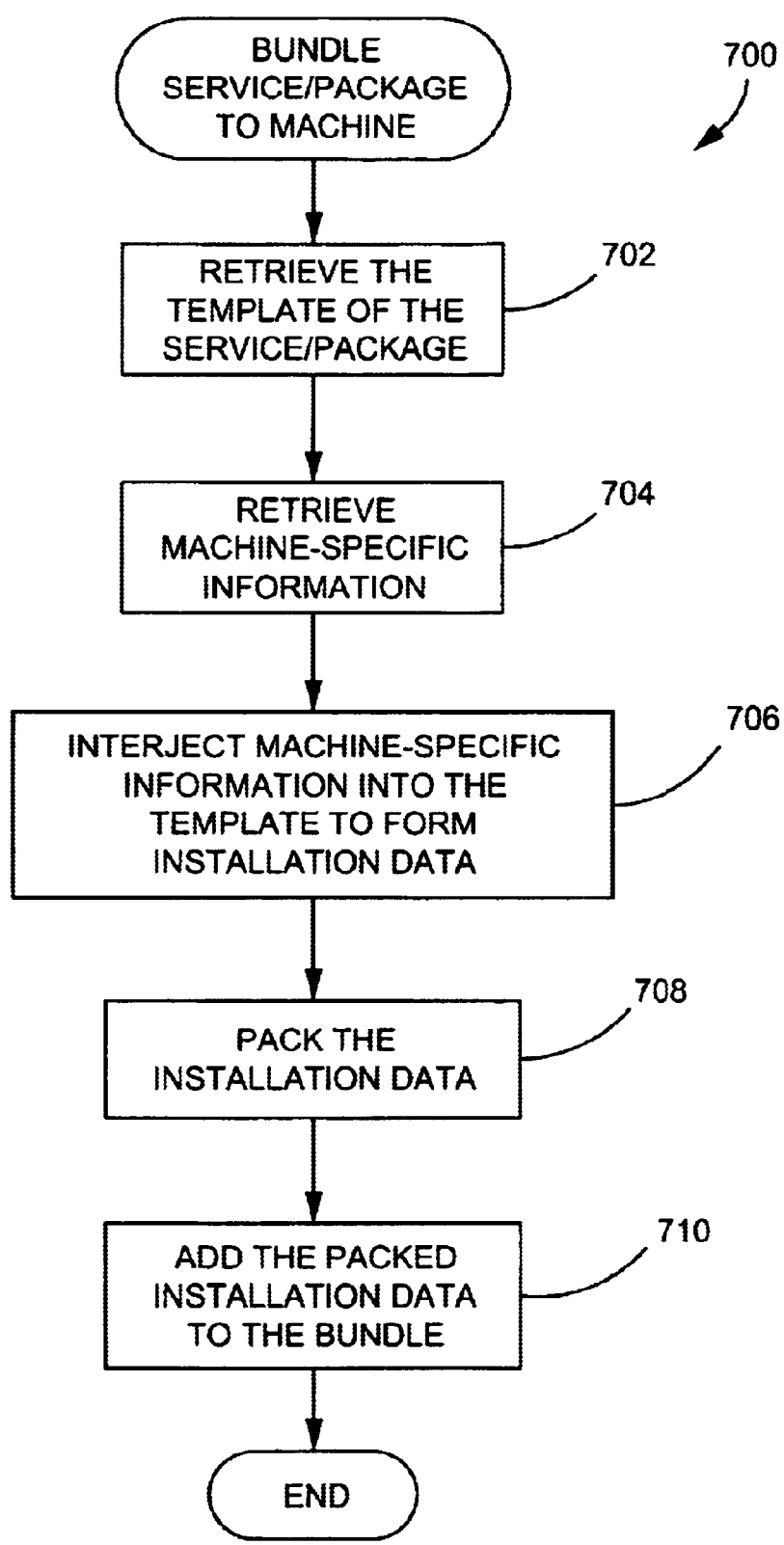
FIG. 7 is a logic flow diagram of the installation of an individual service or package in accordance with the present invention.

Logic flow diagram 500 (FIG. 5) illustrates installation of a service to a particular one of servers 104A–C (FIG. 1). In the context of logic flow diagram 500 (FIG. 5), the service being installed is referred to as the subject service and the particular one of servers 104A–C to which the subject service is being installed is referred to as the subject server. In step 502 (FIG. 5), master server 108 (FIG. 1) retrieves the service version record of service version table 346 (FIG. 3) which represents the service to be installed and the machine and IP records associated with the service. In step 504 (FIG. 5), master server 108 (FIG. 1) bundles the service to the one of servers 104A–C which is associated with the service in a manner described more completely below in conjunction with logic flow diagram 700 (FIG. 7). As used herein, "bundling" refers to collection and preparation of data and software for transport to the subject server. Initially, the bundle is empty. Bundling of the subject service in the manner described below adds data and software representing the service to the bundle for ultimate transport to the subject server in step 514 (FIG. 5) below.

In step 506, master server 108 (FIG. 1) finds all packages on which the subject service depends. Master server 108 finds such packages by searching service-package table 310 (FIG. 3) for all records whose service version identifiers 314 identify the subject service. Package version identifiers 316 of such records identify packages on which the subject service depends.

Loop step 508 (FIG. 5) and next step 512 define a loop in which each of the packages is processed according to step 510. During each iteration of the loop of steps 508–512, the package processed according to step 510 is referred to as the subject package. Once all packages on which the subject service depend have been processed according to the loop of steps 508–512, processing transfers to step 514 which is described below.

Figure 6:
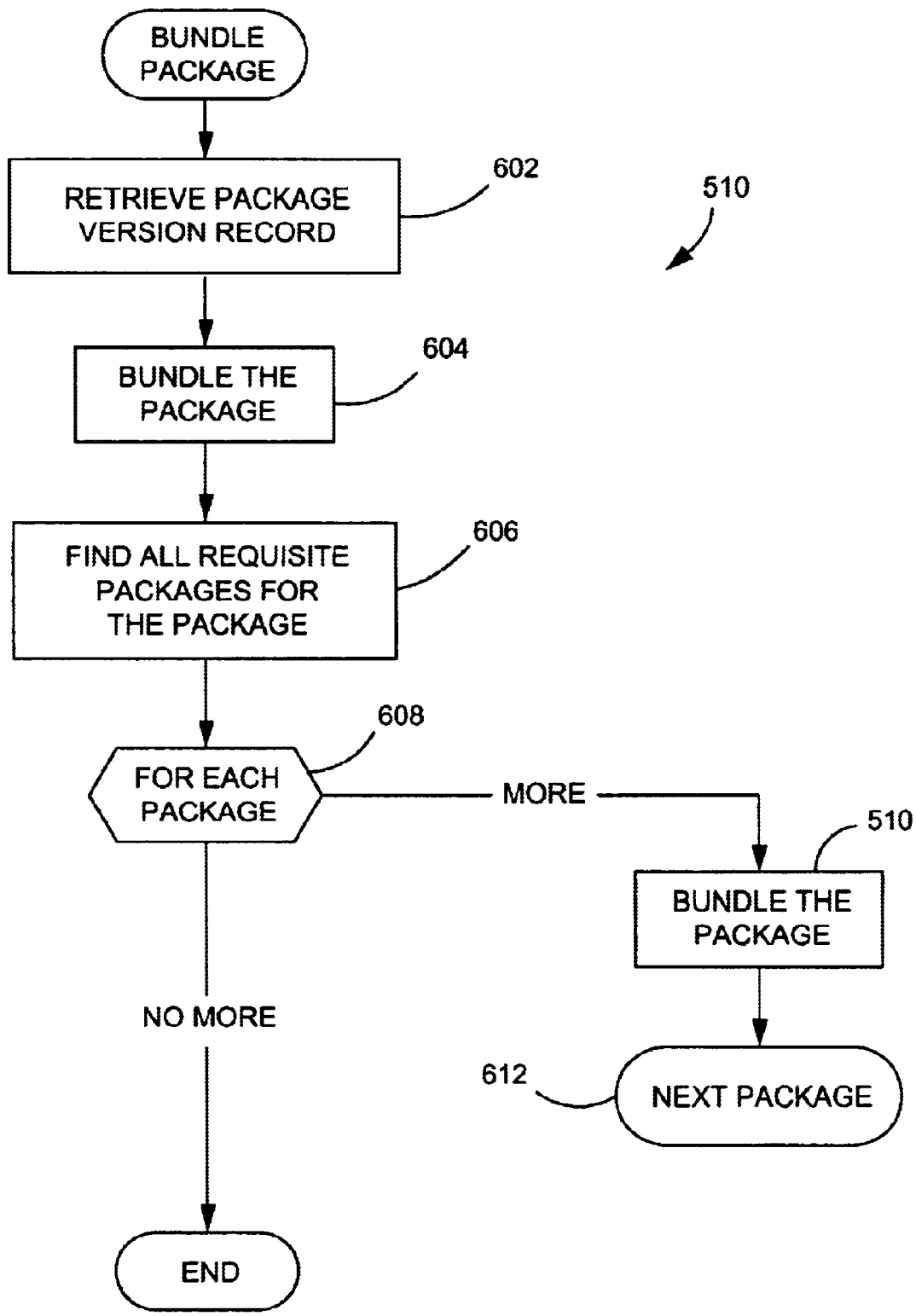
FIG. 6 is a logic flow diagram of the installation of a package and requisite packages in accordance with the present invention.

Each package on which the subject service depends is therefore processed according to step 510. In step 510, master server 108 (FIG. 1) bundles the subject package and all packages on which the subject package depends for transport to the subject server. Step 510 is shown in greater detail as logic flow diagram 510 (FIG. 6). In step 602 (FIG. 6), master server 108 (FIG. 1) retrieves the package version record of package version table 336 (FIG. 3) which represents the subject package and the machine and IP records associated with the subject package, i.e., the same machine and IP records for the subject service. In step 604 (FIG. 6), master server 108 (FIG. 1) bundles the subject package for transport to the subject server in a manner described more completely below in conjunction with logic flow diagram 700 (FIG. 7).

In step 606 (FIG. 5), master server 108 (FIG. 1) finds all packages on which the subject package depends. Master server 108 finds such packages by searching package dependency table 302 for all records whose package version identifiers 306 identify the subject package. Referenced package version identifiers 308 of such records identify packages on which the subject package depends.

Loop step 608 (FIG. 6) and next step 612 define a loop in which each of the packages is processed according to step 510. Step 510 is performed recursively. As described above, master server 108 (FIG. 1) bundles each package, and all packages on which the package depends, for transport to the subject server in step 510. Once all packages on which the subject package depends have been processed according to the loop of steps 608–612, processing according to logic flow diagram 510, and therefore step 510 (FIG. 5), completes.

Once the subject service and all packages on which the service depends are bundled, the contents of the bundle is transported to the subject server in step 514. Master server 108 (FIG. 1) transports the contents of the bundle through computer network 110 to the subject one of servers 104A–C, in particular, to a predetermined location within the subject server such as a predetermined directory within the subject server, e.g., "/tmp." In this illustrative embodiment, master server 108 transports the contents of the bundle using the known "scp" utility. After step 514 (FIG. 5), processing according to logic flow diagram 500 completes.

In this illustrative embodiment, the bundle is a script, execution of which causes the contents of the bundle to be transported to the subject server. In this embodiment, step 504 includes writing an "install-service-to-machine" command to the script, and step 604 (FIG. 6) includes writing an "install-package-to-machine" command to the script. Upon completion of logic flow diagrams 500 and 510, master server 108 (FIG. 1) writes an end-of-script marker, e.g., "#EOF," to the script such that another process within master server 108 which is responsible for executing the script will refrain from doing so until the script is complete.

In this illustrative embodiment, the script is executed with the highest available privileges, e.g., as "root" on a UNIX operating system of master server 108. Such allows execution of the script to perform tasks only "root" can perform such as assigning the owner of data files. Accordingly, a few precautions are taken to avoid unauthorized cracking and interference with the installation process. First, the script is executed only if the script is owned by an entity which is previously designated as authorized to create installation scripts, e.g., the web server process in this illustrative embodiment. Second, the script is not executed in the conventional manner. Instead, the script is read command-by-command and each command is executed only if the command is either the "install-service-to-machine" command or the "install-package-to-machine" command. Accordingly, other commands which might be placed in the script by a skilled but unauthorized cracker are not executed with such high privileges. In an alternative embodiment, the script includes an encrypted signature, e.g., encrypted according to the known MD5 encryption algorithm or similar encryption algorithm, and general purpose commands other than the "install-service-to-machine" and "install-package-to-machine" commands are permitted.

While the script is executed by "root" in this illustrative embodiment, the transport through computer network 110 by the "scp" utility is performed under a less privileged authority. Allowing a highly privileged authority to authenticate itself through a computer network in a script requires that such authentication can be accomplished without human intervention, e.g., to enter a password. Accordingly, an "install" authority has minimal privileges and preforms the transfer of the installation data through the "scp" utility.

Figure 8:
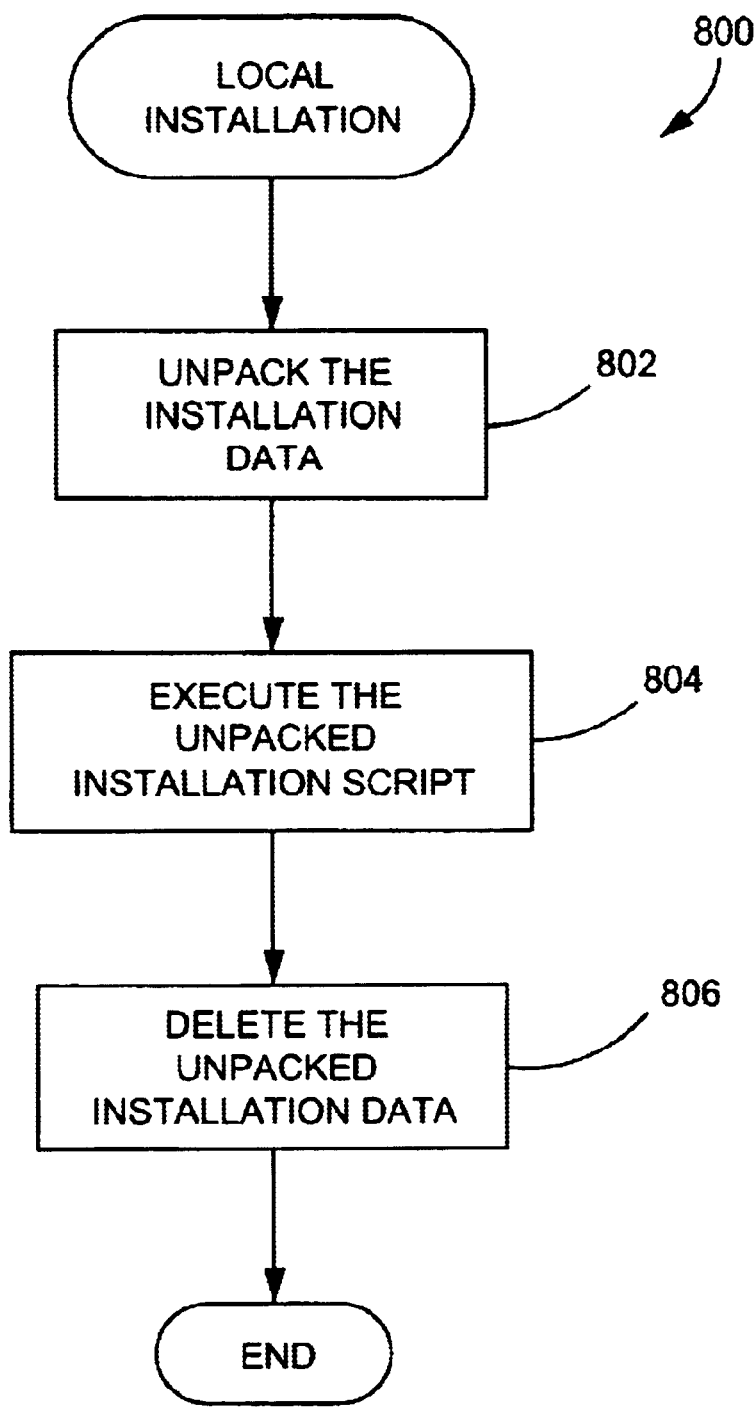
FIG. 8 is a logic flow diagram of the local installation by a server in accordance with the present invention.

Within each of servers 104A–C, an installation manager executes. The installation manager periodically, e.g., every five (5) minutes, determines whether packed installation data exists in the predetermined location to which master server 108 writes such packed installation data. Upon detection by the installation manager, the installation manager processes the packed installation data in a manner described below in conjunction with logic flow diagram 800 (FIG. 8).

Logic flow diagram 700 (FIG. 7) illustrates bundling of either a service or a package for installation to the subject server. In the context of logic flow diagram 700, bundling of a package is analogous to bundling of a service. Accordingly, a service is described as being bundled in the context of logic flow diagram 700 and that description is equally applicable to installation of a package except as otherwise noted. In the following description of logic flow diagram 700, the service being bundled is referred to as the subject service.

In step 702 (FIG. 7), master server 108 (FIG. 1) retrieves the template of the subject service, e.g., template 202. In step 704 (FIG. 7), master server 108 retrieves server-specific information, namely, the IP address and the host name as represented in package/service interdependency database 210. In step 706 (FIG. 7), master server 108 replaces the placeholder data of the retrieved template as described above with the server-specific information to form installation data. For example, master server 108 replaces each occurrence of "%%WEB_IP%%" and "%%MUSIC_IP%%" within configuration data files 204 and installation scripts 206 with the IP address of the appropriate type of the subject server as retrieved from package/service interdependency database 210. Similarly, master server 108 replaces each occurrence of "%%MACHINE_NAME%%" within configuration data files 204 and installation scripts 206 with the host name of the subject server as retrieved from package/service interdependency database 210. As a result of step 706 (FIG. 7), master server 108 has produced all data necessary for installation of the subject service on the subject server. Such installation data includes configuration data files specifically configured for the subject server, program modules—e.g., program modules 208—which define the behavior of the subject service, and installation scripts which are specifically configured to install the configuration data files and program modules to execute properly within the subject server.

Master server 108 packs the installation data in step 708 (FIG. 7). Such packing includes forming an archive of the installation data, e.g., using the known "tar" archive utility, and compressing the archive to minimize the requisite network bandwidth in transporting the archive from master server 108 through computer network 110 to the subject one of servers 104A–C. In this illustrative embodiment, compression is accomplished by the known "gzip" compression utility. In an alternative embodiment, compression is accomplished by the known "compress" compression utility available with many commercial distributions of the UNIX operating system.

In step 710 (FIG. 7), master server 108 adds the packed installation data to the bundle for subsequent transport through computer network 110 to the subject one of servers 104A–C.

After step 710 (FIG. 7), processing by master server 108 (FIG. 1) in installing the service or package completes. As described above, after transport of the bundled installation data to the subject server and upon detection by the installation manager of the subject server, the installation manager processes the packed installation data in a manner illustrated by logic flow diagram 800 (FIG. 8).

In step 802, the installation manager of the subject server unpacks the packed installation data. In this illustrative embodiment, the installation manager first decompresses the installation data using the known "gzip" compression utility and then extracts the individual data files of the installation data using the known "tar" archiving utility. As described above, the known "compress" compression utility is used in an alternative embodiment to decompress the installation data. The extracted data files include configuration data files, installation scripts, and/or program modules which are specifically tailored to the subject server in manner described above.

In step 804, the installation manager of the subject server executes the installation scripts. All logic required to effect installation of the subject service or package is embodied in the installation scripts included with the program modules and configuration data files. Accordingly, any changes in the manner in which services and packages are installed are controlled through the master server. As a result, virtually no direct maintenance of servers 104A–C are required. Instead, virtually all maintenance of software installed on servers 104A–C is automated through master server 108. Execution of the installation scripts by the installation manager of the subject server typically includes copying of the configuration data files and program modules to appropriate locations within storage of the subject server. Such locations are described below and are configured to allow multiple versions of each service and package to coexist within the subject server. Examples of other tasks that can be performed by the installation scripts include for example (i) creating a directory for storage of log files, (ii) creating a username under which the service or package is to execute, (iii) storing symbolic links to the service or package in a location within the subject server such that the operating system of the subject server is aware of the existence and location of the service or package and can automatically initiate execution of the service or package, and (iv) initiating execution of other installation scripts which perform such tasks as those described above.

After step 804 (FIG. 8), installation of the subject service and packages on which the service depends is complete and the service and packages are available to clients of the subject server. In step 806, the installation manager of the subject server deletes any remnants of the installation data from the predetermined location at which the packed installation data was received. After step 806, processing according to logic flow diagram 800 completes.

Integration with Source Code Control

In the embodiments described above, the services and packages—in particular the executable computer instructions such as program modules 208 (FIG. 2)—are stored and moved through computer network 110 as object code. Object code is the object of a process known as compilation. Compiling of computer code is the translation of the computer code from a form intelligible to human software engineers, i.e., source code, to a form more near the form of instructions executed in the particular type of processor for which the computer code is intended.

To form program modules 208, source code is written by software engineers and compiled into object code which is then stored with templatized configuration data files 204 and templatized installation scripts 206 to form template 202. Further in accordance with the present invention, the process of making template 202 can be further streamlined such that even less human interaction is needed to bring new versions of packages and services into use in any of servers 104A–C.

Such streamlining is provided by combining a source code control system 212 (FIG. 2), such as the known Concurrent Versions System (CVS), with the automated installation system described above.

In particular, step 502 (FIG. 5) of logic flow diagram 500 is modified to look to source code control system 212 (FIG. 2) rather than template 202 for program modules 208. Step 602 is modified in a directly analogous manner such that the follow description of modification to step 502 is equally applicable to step 602.

Figure 10:
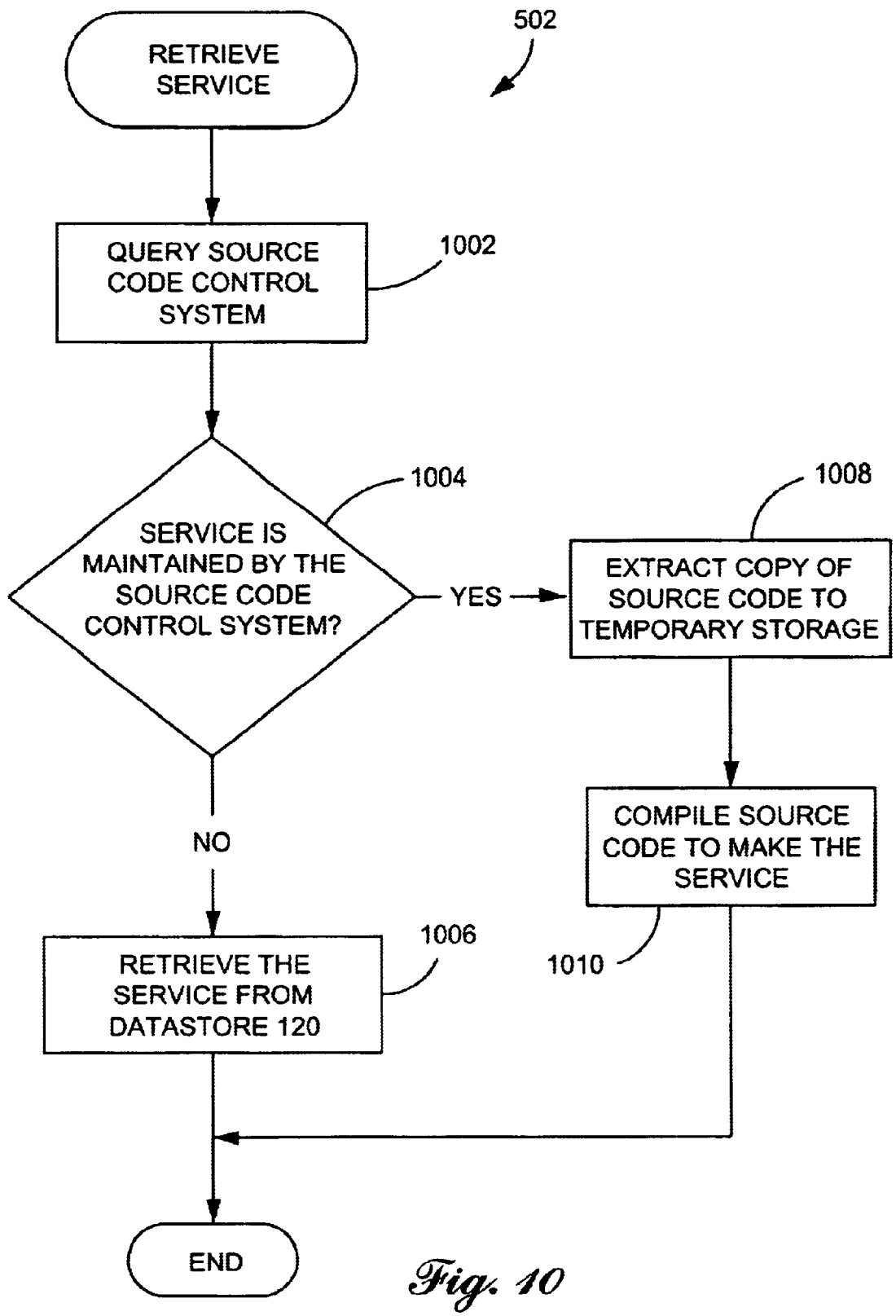
FIG. 10 is a logic flow diagram of retrieval of a service from a source code control system.

Step 502 is shown in greater detail as logic flow diagram 502 (FIG. 10). In step 1002, master server 108 (FIG. 1) queries source code control system 212 (FIG. 2) to determine whether the subject service is maintained within source code control system 212. Master server 108 (FIG. 1) makes such a determination by requesting a read-only copy of the subject service and determining whether source code control system 212 returns an error message indicating no such source code is maintained within source code control system 212. In test step 1004 (FIG. 10), master server 108 determines from the response of source code control system 212 (FIG. 2) whether source code control system 212 maintains the subject service.

If source code control system 212 does not maintain the subject service, master server 108—in step 1006—retrieves program modules 208 from template 202 and processing according to logic flow diagram 502, and therefore step 502 (FIG. 5), completes.

Conversely, if source code control system 212 (FIG. 2) maintains the subject services, processing transfers from test step 1004 (FIG. 10) to step 1008. In step 1008, master server 108 (FIG. 1) extracts a copy of the source code for the subject service into a temporary location. In step 1010 (FIG. 10), master server 108 (FIG. 1) compiles the source code to form program modules 208 (FIG. 2). In this illustrative embodiment, master server 108 (FIG. 1) uses the known "make" command to compile the extracted source code. After step 1010, processing according to logic flow diagram 502, and therefore step 502 (FIG. 5), completes. Program modules 208 (FIG. 2) are then bundled and transported to the subject server in the manner described above.

In an alternative embodiment, the retrieved source code itself is bundled and transported to the subject server in the manner described above and the installation script executed by the subject server compiles the source code within the subject server. Whether the source code is compile within the subject server or within master server 108, any retrieved copies of the source code and any other intermediate data files of the compilation are deleted and the resulting object code is stored in the appropriate directory as described more completely below and as specified in the installation script.

Thus, according to logic flow diagram 502 (FIG. 5), all the advantages of elaborate source code control systems such as CVS are added to the automated service/package installation system described herein. By merely associating a service or package with a particular one of servers 104A–C in the manner described above, the latest source code is automatically compiled and sent to the server with minimal involvement of a human network manager.

Service and Package Organization in a Server

Figure 9:
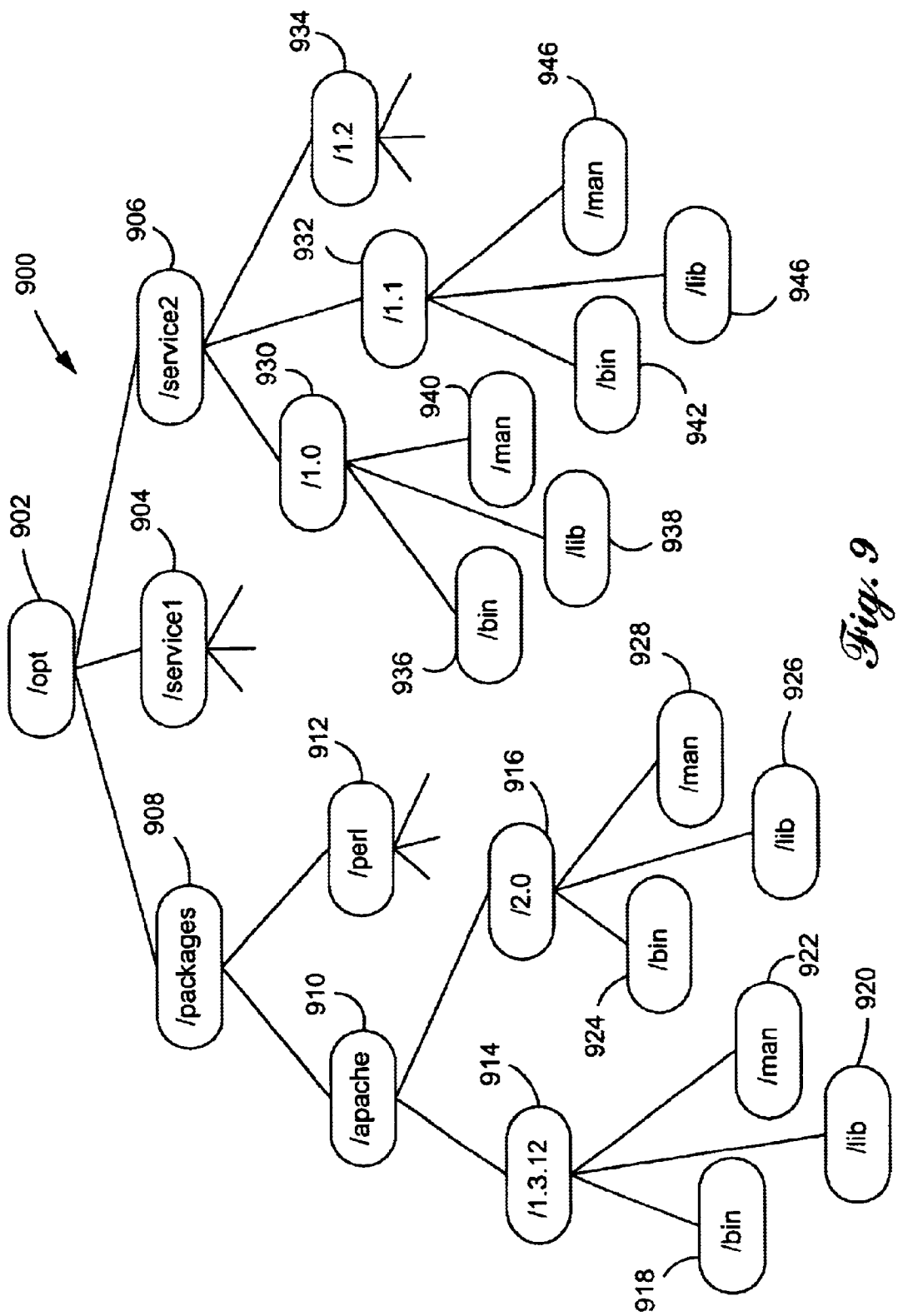
FIG. 9 is a block diagram illustrating the directory hierarchy by which multiple versions of services and packages can coexist in a single server in accordance with the present invention.

As described briefly above, multiple versions of a service or package can coexist within a server, e.g., server 104A. Directory structure 900 (FIG. 9) illustrates the organization of data files within server 104A to allow multiple versions of a package or service to exist concurrently within server 104A.

An "opt" directory 902 contains directories for all services and packages installed in server 104A. Directories 904 and 906 each contain a respective installed service. A "packages" directory 908 contains all installed packages of server 104A, and directories 910 and 912 each contain a respective installed package. In this illustrative example, directory 910 contains the installed package implementing the known "apache" World Wide Web server, and directory 912 contains the package implementing the known "perl" scripting language.

For illustration purposes, consider the example in which the service of directory 904 requires a specific version of apache, e.g., version 1.3.12, and the service of directory 906 requires a different version of apache, e.g., version 2.0. All data files which are version-independent are stored in directory 910. Version-independent data files of directory 910 can be, for example, data files specifying Multi-purpose Internet Mail Extension (MIME) types and corresponding filename extensions specifying a particular data file type served by apache. Version-independent data files can also be stored in a subdirectory of directory 910 which is designated for storage of version-independent data files. Version-specific data files are stored in appropriate version-specific directories. For examples, data files which are specific to version 1.3.12 of apache are stored in directory 914 and subdirectories thereof (e.g., directories 918–922), and data files which are specific to version 2.0 of apache are stored in directory 916 and subdirectories thereof (i.e., directories 924–928). The first service, i.e., the service of directory 904, is configured to use the version of apache stored in directory 914 which in turn is configured to look to directory 910 for some of the configuration data, namely, version-independent configuration data. The second service, i.e., the service of directory 906, is configured to use the version of apache stored in directory 916 which in turn is configured to look to directory 910 for some of the configuration data, namely, version-independent configuration data.

There are a number of ways in which a service can be configured to use a specific version of a package. The following examples are illustrative.

In one example, the package is the known perl scripting language interpreter. In this example, program modules 208 (FIG. 2) include perl scripts. A perl script includes, in its first line, data identifying the specific perl interpreter which should execute the script. Accordingly, perl scripts in program modules 208 include placeholder data in the first line, such as "%%PERL__VROOT%%," which represents the version-dependent directory in which such an interpreter is installed. Accordingly, when deployed, the scripts are modified such that the placeholder data is replaced with data specifying the version-dependent directory for the specific version of perl as described above with respect to step 706 (FIG. 7). As a result, executing of any such scripts involves interpretation in accordance with the specific version of perl indicated in the perl scripts of program modules 208 (FIG. 2). Such scripts which define part of a service are therefore configured to use a particular version of a package, e.g., perl.

In another example, the package is the known apache web server package. In this example, the apache web server package is set to execute continuously and to monitor requests for the particular service using the apache web server package, i.e., the subject service in this context. The apache web server package can determine whether a request is for the particular service according to the URL (universal resource locator) of the request. In this example, installation of the subject service configures the particular version of the package, e.g., the apache web server package, to refer requests to the service.

Installation of the subject service executes an "install-for-service" script for the appropriate version of the apache web server package. The "install-for-service" script is part of the installation of the package and creates symbolic links which cause the package to be started upon booting of the server on which the package and subject service are installed. The symbolic links also configure the package to interact with the subject service, e.g., by forwarding requests intercepted by the apache web server package to the subject service. Such symbolic links can refer to scripts, execution of which cause the apache web server to execute and to monitor requests for specific URLs. Thus, when the server is booted, the specific version of the apache web server package is started and is configured to handle requests of the subject service and to forward such requests to the subject service. In this way, the subject service is configured to use a specific version of the package.

A number of advantages are realized by allowing multiple versions of a package to execute concurrently on the subject server. One advantage is the assurance of continued operation of previously installed services. Consider the example of FIG. 9. The first service (of directory 904) depends upon version 1.3.12 of apache while the second service (of directory 906) depends upon version 2.0 of apache. If installation of the second service included replacing version 1.3.12 of apache with version 2.0, the first service would then interact with version 2.0 of apache and may fail to execute properly due to differences between the respective versions of apache. Accordingly, installation of the second service and the newer version of apache does not affect the performance of the first, previously installed service.

Another advantage is improved fault resistance of the subject server. Suppose, for example, that execution of the second service together with version 2.0 of apache results in an invalid state which causes failure of apache version 2.0. Since version 1.3.12 of apache executes independently within the subject server, apache version 1.3.12, the second service, and other services which depend upon apache version 1.3.12 can continue to execute successfully without interruption.

This latter advantage can also be realized for services that use the same version of a package. Since the "install-for-service" script is executed-for some packages such as the apache web server package—for each service using that package. The result is that a separate process for such a package executes for each service for which the package is installed. Accordingly, a failure in one process of the package does not interrupt execution of other processes of the same version of the same package, and services depending on those other package processes continue to function properly. Thus, fault resistance is significantly improved.

The above description is illustrative only and is not limiting. For example, while a single master server 108 (FIG. 1) is shown, it is appreciated that the acts performed by master server 108 as described herein can be performed by a number of computer systems working cooperatively. It is preferred that such computer systems are sufficiently closely coupled and coordinated, e.g., through a local area network or as a distributed computer system, to provide a comprehensive and integral package/service interdependency database 210. In addition, computer network 110 is the Internet in this illustrative example. However, computer network 110 can be a different network such as a local area network or a different wide area network. The present invention is limited only by the claims which follow.

What is claimed is:

1. A method for installing software in a computer system, the method comprising:
   (a) installing a first version of the software in the computer system by:
      (i) storing version-independent data of the first version of the software in a first location within the computer system; and
      (ii) storing version-specific data of the first version of the software in a second location, which is different from the first location, within the computer system; and
   (b) installing a second version of the software in the computer system by:
      (i) storing version-independent data of the second version of the software in the first location within the computer system; and
      (ii) storing version-specific data of the second version of the software in a third location, which is different from the first and second locations, within the computer system.

2. The method of claim 1 wherein the first location is a first directory.

3. The method of claim 1 wherein the second location is a second directory.

4. The method of claim 1 wherein the third location is a third directory.

5. The method of claim 1 wherein the second and third locations are second and third directories, respectively.

6. The method of claim 1 wherein the first, second, and third locations are first, second, and third directories, respectively.

7. The method of claim 1 wherein execution of the first version of the software accesses the version-independent data from the first location and accesses version-dependent data from the second location.

8. The method of claim 1 wherein execution of the second version of the software accesses the version-independent data from the first location and accesses version-dependent data from the third location.

9. The method of claim 1 wherein execution of the first version of the software accesses the version-independent data from the first location and execution of the second version of the software accesses the version-independent data from the first location.

10. A computer-readable storage medium on which is stored computer code which, when executed by a computer, causes the computer to install software in a computer system by:
   (a) installing a first version of the software in the computer system by:
      (i) storing version-independent data of the first version of the software in a first location within the computer system; and
      (ii) storing version-specific data of the first version of the software in a second location, which is different from the first location, within the computer system; and
   (b) installing a second version of the software hi the computer system by:
      (i) storing version-independent data of the second version of the software in the first location within the computer system; and
      (ii) storing version-specific data of the second version of the software in a third location, which is different from the first and second locations, within the computer system.

11. The computer-readable storage medium of claim 10 wherein the first location is a first directory.

12. The computer-readable storage medium of claim 10 wherein the second location is a second directory.

13. The computer-readable storage medium of claim 10 wherein the third location is a third directory.

14. The computer-readable storage medium of claim 10 wherein the second and third locations are second and third directories, respectively.

15. The computer-readable storage medium of claim 10 wherein the first, second, and third locations are first, second, and third directories, respectively.

16. The computer-readable storage medium of claim 10 wherein execution of the first version of the software accesses the version-independent data from the first location and accesses version-dependent data from the second location.

17. The computer-readable storage medium of claim 10 wherein execution of the second version of the software accesses the version-independent data from the first location and accesses version-dependent data from the third location.

18. The computer-readable storage medium of claim 10 wherein execution of the first version of the software accesses the version-independent data from the first location and execution of the second version of the software accesses the version-independent data from the first location.

19. A computer system comprising:
   a processor;
   a memory coupled to the processor; and
   an installation module which executes in the processor from the memory and which, when executed, installs software in a second computer system by:
     (a) installing a first version of the software in the second computer system by:
       (i) storing version-independent data of the first version of the software in a first location within the second computer system; and
       (ii) storing version-specific data of the first version of the software in a second location, which is different from the first location, within the second, computer system; and
     (b) installing a second version of the software in the second computer system by:
       (i) storing version-independent data of the second version of the software in the first location within the second computer system; and
       (ii) storing version-specific data of the second version of the software in a third location, which is different from the first and second locations, within the second computer system.

20. The computer system of claim 19 wherein the first location is a first directory.

21. The computer system of claim 19 wherein the second location is a second directory.

22. The computer system of claim 19 wherein the third location is a third directory.

23. The computer system of claim 19 wherein the second and third locations are second and third directories, respectively.

24. The computer system of claim 19 wherein the first, second, and third locations are first, second, and third directories, respectively.

25. The computer system of claim 19 wherein execution of the first version of the software accesses the version-independent data from the first location and accesses version-dependent data from the second location.

26. The computer system of claim 19 wherein execution of the second version of the software accesses the version-independent data from the first location and accesses version-dependent data from the third location.

27. The computer system of claim 19 wherein execution of the first version of the software accesses the version-independent data from the first location and execution of the second version of the software accesses the version-independent data from the first location.

28. The method of claim 1 wherein the first version of the software provides a first service and the second version of the software provides a second service not provided by the first version of the software.

29. The method of claim 28 wherein the first service and the second service are provided and can execute concurrently on the computer system.

30. The computer-readable storage medium of claim 10 wherein the first version of the t he provides a first service and the second version of the software provides a second service not provided by the first version of the software.

31. The computer-readable storage medium of claim 30 wherein the first service and the second service are provided and can execute concurrently on the computer system.

32. The computer system of claim 19 wherein the first version of the software provides a first service and the second version of the software provides a second service not provided by the first version of the software.

33. The computer system of claim 32 wherein the first service and the second service are provided and can execute concurrently on the second computer system.

34. A method for installing software in a computer system, the method comprising:
   (a) installing a first version of the software in the computer system by:
     (i) storing version-independent data of the first version of the software in a first location within the computer system; and
     (ii) storing version-specific data of the first version of the software in a second location, which is different from the first location, within the computer system; and
   (b) installing a second version of the software in the computer system, the second version being subsequent to the first version, by:
     (i) storing version-independent data of the second version of the software in the first location within the computer system; and
     (ii) storing version-specific data of the second version of the software in a third location, which is different from the first and second locations, within the computer system.

35. The method of claim 34 wherein the first version of the software provides a first service and the second version of the software provides a second service.

36. The method of claim 35 wherein the first service and the second service are available simultaneously, the first service continuing to be provided without change while the second service is added to the computer system.

37. A computer-readable storage medium on which is stored computer code which, when executed by a computer, causes the computer to install software in a computer system by:
   (a) installing a first version of the software in the computer system by:
     (i) storing version-independent data of the first version of the software in a first location within the computer system; and
     (ii) storing version-specific data of the first version of the software in a second location, which is different from the first location, within the computer system; and
   (b) installing a second version of the software in the computer system, the second version being subsequent to the first version, by:

(i) storing version-independent data of the second version of the software in the first location within the computer system; and (ii) storing version-specific data of the second version of the software in a third location, which is different from the first and second locations, within the computer system.

38. The computer-readable storage medium of claim 37 wherein the first version of the software provides a first service and the second version of the software provides a second service.

39. The computer-readable storage medium of claim 38 wherein the first service and the second service are available simultaneously, the first service continuing to be provided without change while the second service is added to the computer system.

40. A computer system comprising:

a processor;

a memory coupled to the processor; and an installation module which executes in the processor from the memory and which, when executed, installs software in a second computer system by:

(a) installing a first version of the software in the second computer system by:

(i) storing version-independent data of the first version of the software in a first location within the second computer system; and (ii) storing version-specific data of the first version of the software in a second location, which is different from the first location, within the second, computer system; and (b) installing a second version of the software in the second computer system, the second version being subsequent to the first version, by:

(i) storing version-independent data of the second version of the software in the first location within the second computer system; and (ii) storing version-specific data of the second version of the software in a third location, which is different from the first and second locations, within the second computer system.

41. The computer system of claim 40 wherein the first version of the software provides a first service and the second version of the software provides a second service.

42. The computer system of claim 41 wherein the first service and the second service are available simultaneously, the first service continuing to be provided without change while the second service is added to the computer system.

* * * * *

UNITED STATES PATENT AND TRADEMARK OFFICE
CERTIFICATE OF CORRECTION

PATENT NO. : 6,725,453 B1
DATED : April 20, 2004
INVENTOR(S) : Lucas et al.

It is certified that error appears in the above-identified patent and that said Letters Patent is hereby corrected as shown below:

Title page,
Item [*] Notice, delete "268 days" and insert -- 446 days --.

Column 3,
Line 8, delete "a network manager".

Column 22,
Line 11, delete "t he" and insert -- the software --.

Signed and Sealed this

Fourteenth Day of February, 2006

JON W. DUDAS
*Director of the United States Patent and Trademark Office*